US012556436B2

(12) United States Patent
Oved et al.

(10) Patent No.: US 12,556,436 B2
(45) Date of Patent: Feb. 17, 2026

(54) INSTANTANEOUS AMPLITUDE GAIN SIDE INFORMATION FOR A MULTIPLEXED SIGNAL

(71) Applicant: QUALCOMM Incorporated, San Diego, CA (US)

(72) Inventors: Tal Oved, Modiin (IL); Gideon Shlomo Kutz, Ramat Hasharon (IL); Michael Levitsky, Rehovot (IL); Elad Meir, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 703 days.

(21) Appl. No.: 18/076,380

(22) Filed: Dec. 6, 2022

(65) Prior Publication Data

US 2024/0187290 A1  Jun. 6, 2024

(51) Int. Cl.
*H04W 72/12* (2023.01)
*H04B 1/12* (2006.01)
*H04L 27/06* (2006.01)
*H04W 8/24* (2009.01)
*H04W 72/232* (2023.01)

(52) U.S. Cl.
CPC .............. *H04L 27/06* (2013.01); *H04B 1/12* (2013.01); *H04W 8/24* (2013.01); *H04W 72/12* (2013.01); *H04W 72/232* (2023.01)

(58) Field of Classification Search
CPC ..................................................... H04W 72/12
USPC ........................................................ 370/329
See application file for complete search history.

(56) References Cited

FOREIGN PATENT DOCUMENTS

EP       3343760 A1 *  7/2018  ............... H03F 3/24

* cited by examiner

*Primary Examiner* — Angel T Brockman
(74) *Attorney, Agent, or Firm* — Holland & Hart LLP

(57) ABSTRACT

Methods, systems, and devices for wireless communications are described. A user equipment (UE) may receive, from a transmitting device, an indication of an instantaneous gain associated with an amplitude distortion associated with frequency division multiplexed downlink communications to the UE from the transmitting device. The UE may receive the frequency division multiplexed downlink communications from the transmitting device over frequency resources allocated to the UE, wherein receiving the frequency division multiplexed downlink communications comprises applying a digital post distortion model to the frequency division multiplexed downlink communications according to the instantaneous gain.

30 Claims, 16 Drawing Sheets

INSTANTANEOUS AMPLITUDE GAIN SIDE INFORMATION FOR A MULTIPLEXED SIGNAL

FIELD OF TECHNOLOGY

The following relates to wireless communication, including instantaneous amplitude gain side information for a multiplexed signal.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communications for communication devices, which may be known as user equipment (UE).

SUMMARY

The described techniques relate to improved methods, systems, devices, and apparatuses that support reception and correction of multiplexed signal amplitude distortion caused, for example, by envelope tracking for a multiplexed signal. For example, the described techniques provide for signaling a compressed instantaneous gain to a user equipment (UE), where the UE is able to recover its data message from a frequency division multiplexed (FDM) downlink communications using the compressed indication (e.g., rather than the UE being configured with and calculating the instantaneous gain allocation for every other UE with information multiplexed into the downlink communications). For example, the transmitting device (e.g., UE or network entity) may identify or otherwise determine an instantaneous gain for the FDM communications. Broadly, the instantaneous gain may correspond to amplitude distortion of the communications. One example of this may include the power amplifier (PA) of the transmitting device distorting the communications (e.g. the waveform or signal carrying the FDM downlink communications), to some degree, using envelope tracking. Envelope tracking may include the power supply of the PA being adjusted in real time based on the instantaneous gain of the PA. For example, one or more time periods of the PA generating the signal may have an instantaneous gain that introduces amplitude distortion into the waveform or signal carrying the FDM downlink communications.

The transmitting device may transmit an indication of the instantaneous gain to the UE. The indication of the instantaneous gain may be provided absolutely (e.g., indicating absolute gain information) and/or provided in a compressed form (e.g., using various quantization techniques, referential reporting, or other information compression techniques). For example, the indication of the instantaneous gain may be for the amplitude distortion associated with the FDM communications allocated to the UE. The UE may receive the FDM downlink communications from the transmitting device over frequency resources (e.g., the signal or waveform carrying the FDM downlink communications over the allocated to the UE) and apply a digital post distortion model to the signal according to the instantaneous gain (e.g., based on the amplitude distortion of the envelope). This compressed indication of the instantaneous gain for the UE (e.g., rather than being informed of the other allocated UEs, their allocation and pilot structures) may be used to correct the distortion effect at the UE's allocation and enable successful decoding of its message from the FDM downlink communications.

A method for wireless communication at a UE is described. The method may include receiving, from a transmitting device, an indication of an instantaneous gain associated with an amplitude distortion associated with FDM downlink communications to the UE from the transmitting device and receiving the FDM downlink communications from the transmitting device over frequency resources allocated to the UE, where receiving the FDM downlink communications includes applying a digital post distortion model to the downlink communications according to the instantaneous gain.

An apparatus for wireless communication at a UE is described. The apparatus may include a processor, memory coupled with the processor, and instructions stored in the memory. The instructions may be executable by the processor to cause the apparatus to receive, from a transmitting device, an indication of an instantaneous gain associated with an amplitude distortion associated with FDM downlink communications to the UE from the transmitting device and receive the FDM downlink communications from the transmitting device over frequency resources allocated to the UE, where receiving the FDM downlink communications includes applying a digital post distortion model to the downlink communications according to the instantaneous gain.

Another apparatus for wireless communication at a UE is described. The apparatus may include means for receiving, from a transmitting device, an indication of an instantaneous gain associated with an amplitude distortion associated with FDM downlink communications to the UE from the transmitting device and means for receiving the FDM downlink communications from the transmitting device over frequency resources allocated to the UE, where receiving the FDM downlink communications includes applying a digital post distortion model to the downlink communications according to the instantaneous gain.

A non-transitory computer-readable medium storing code for wireless communication at a UE is described. The code may include instructions executable by a processor to receive, from a transmitting device, an indication of an instantaneous gain associated with an amplitude distortion associated with FDM downlink communications to the UE from the transmitting device and receive the FDM downlink communications from the transmitting device over frequency resources allocated to the UE, where receiving the FDM downlink communications includes applying a digital post distortion model to the downlink communications according to the instantaneous gain.

In some examples of the method, apparatuses, and non-transitory computer-readable medium described herein, identifying, based on the instantaneous gain, the amplitude distortion associated with the FDM downlink communications, where the digital post distortion model may be applied based on the instantaneous gain and the amplitude distortion and decoding a message for the UE from the FDM downlink communications based on applying the digital post distortion model.

In some examples of the method, apparatuses, and non-transitory computer-readable medium described herein, identifying, based on the indication of the instantaneous gain, a set of amplitude distortions for a corresponding time period of a set of time periods of the FDM downlink communications, where the digital post distortion model may be applied during the set of time periods.

Some examples of the method, apparatuses, and non-transitory computer-readable medium described herein may further include operations, features, means, or instructions for identifying each amplitude distortion in the set of amplitude distortions based on a corresponding instantaneous gain for the corresponding time period satisfying a threshold.

Some examples of the method, apparatuses, and non-transitory computer-readable medium described herein may further include operations, features, means, or instructions for identifying the set of time periods based on a threshold number of amplitude distortions satisfying an amplitude distortion threshold level.

In some examples of the method, apparatuses, and non-transitory computer-readable medium described herein, identifying, based on the indication of the instantaneous gain, a start time, a duration, or a combination thereof, for each amplitude distortion of the set of amplitude distortions, where the set of time periods may be based on the start time, the duration, or the combination thereof.

Some examples of the method, apparatuses, and non-transitory computer-readable medium described herein may further include operations, features, means, or instructions for transmitting a UE capability message indicating that the UE supports applying the digital post distortion model based on the instantaneous gain.

Some examples of the method, apparatuses, and non-transitory computer-readable medium described herein may further include operations, features, means, or instructions for receiving an instruction to apply the digital post distortion model at the UE.

In some examples of the method, apparatuses, and non-transitory computer-readable medium described herein, receiving the instruction may include operations, features, means, or instructions for receiving a downlink control information scheduling transmission of the FDM downlink communication to the UE, where the instruction to apply the digital post distortion model may be conveyed in the downlink control information.

In some examples of the method, apparatuses, and non-transitory computer-readable medium described herein, receiving the instruction may include operations, features, means, or instructions for receiving instructions to switch from a first semi-static state to a second semi-static state, where the instructions to switch to the second semi-static state conveys the instruction to apply the digital post distortion model to the FDM downlink communications.

In some examples of the method, apparatuses, and non-transitory computer-readable medium described herein, receiving the instruction may include operations, features, means, or instructions for receiving radio resource control signaling one or more parameters for the UE, where at least one of the one or more parameters may be set to a value that conveys the instruction to apply the digital post distortion model to the FDM downlink communications.

In some examples of the method, apparatuses, and non-transitory computer-readable medium described herein, the indication of the instantaneous gain may be received via one or more of a downlink control information, a data channel, a dedicated channel, or a combination thereof.

In some examples of the method, apparatuses, and non-transitory computer-readable medium described herein, the FDM downlink communications may be multiplexed with one or more additional FDM downlink communications associated with one or more additional UEs.

In some examples of the method, apparatuses, and non-transitory computer-readable medium described herein, the FDM downlink communications and the one or more additional FDM downlink communications may be associated with a same transmit beam of the transmitting device.

Some examples of the method, apparatuses, and non-transitory computer-readable medium described herein may further include operations, features, means, or instructions for applying a digital post distortion model to the FDM downlink communications includes at least one of estimating a channel that includes allocations for the FDM downlink communications, estimating constellation points of signals associated with the channel, equalizing the signals, estimating non-linearities of the signals, correcting for the non-linearities of at least a portion of the signals, or a combination thereof.

A method for wireless communication at a transmitting device is described. The method may include transmitting, to a UE, an indication of an instantaneous gain associated with an amplitude distortion associated with FDM downlink communication to the UE from the transmitting device and transmitting the FDM downlink communication to the UE over frequency resources allocated to the UE, where the UE applies a digital post distortion model to the FDM downlink communication according to the instantaneous gain.

An apparatus for wireless communication at a transmitting device is described. The apparatus may include a processor, memory coupled with the processor, and instructions stored in the memory. The instructions may be executable by the processor to cause the apparatus to transmit, to a UE, an indication of an instantaneous gain associated with an amplitude distortion associated with FDM downlink communication to the UE from the transmitting device and transmit the FDM downlink communication to the UE over frequency resources allocated to the UE, where the UE applies a digital post distortion model to the FDM downlink communication according to the instantaneous gain.

Another apparatus for wireless communication at a transmitting device is described. The apparatus may include means for transmitting, to a UE, an indication of an instantaneous gain associated with an amplitude distortion associated with FDM downlink communication to the UE from the transmitting device and means for transmitting the FDM downlink communication to the UE over frequency resources allocated to the UE, where the UE applies a digital post distortion model to the FDM downlink communication according to the instantaneous gain.

A non-transitory computer-readable medium storing code for wireless communication at a transmitting device is described. The code may include instructions executable by a processor to transmit, to a UE, an indication of an instantaneous gain associated with an amplitude distortion associated with FDM downlink communication to the UE from the transmitting device and transmit the FDM downlink communication to the UE over frequency resources allocated to the UE, where the UE applies a digital post distortion model to the FDM downlink communication according to the instantaneous gain.

Some examples of the method, apparatuses, and non-transitory computer-readable medium described herein may further include operations, features, means, or instructions for identifying the amplitude distortion associated with the FDM downlink communication, where the instantaneous gain may be based on the amplitude distortion.

Some examples of the method, apparatuses, and non-transitory computer-readable medium described herein may further include operations, features, means, or instructions for identifying a set of amplitude distortions for a corresponding time period of a set of time periods of the FDM downlink communications, where the instantaneous gain may be based on the set of amplitude distortions.

Some examples of the method, apparatuses, and non-transitory computer-readable medium described herein may further include operations, features, means, or instructions for identifying each amplitude distortion in the set of amplitude distortions based on a corresponding instantaneous gain for the corresponding time period satisfying a threshold, where the instantaneous gain may be based on the corresponding instantaneous gain for the corresponding time period.

Some examples of the method, apparatuses, and non-transitory computer-readable medium described herein may further include operations, features, means, or instructions for identifying the set of time periods based on a threshold number of amplitude distortions satisfying a threshold.

Some examples of the method, apparatuses, and non-transitory computer-readable medium described herein may further include operations, features, means, or instructions for identifying a start time, a duration, or a combination thereof, for each amplitude distortion of the set of amplitude distortions, where the set of time periods may be based on the start time, the duration, or the combination thereof.

Some examples of the method, apparatuses, and non-transitory computer-readable medium described herein may further include operations, features, means, or instructions for receiving a UE capability message indicating that the UE supports applying the digital post distortion model based on the instantaneous gain.

Some examples of the method, apparatuses, and non-transitory computer-readable medium described herein may further include operations, features, means, or instructions for transmitting an instruction to apply the digital post distortion model at the UE.

In some examples of the method, apparatuses, and non-transitory computer-readable medium described herein, transmitting the instruction may include operations, features, means, or instructions for transmitting a downlink control information scheduling transmission of the FDM downlink communications to the UE, where the instruction to apply the digital post distortion model may be conveyed in the downlink control information.

In some examples of the method, apparatuses, and non-transitory computer-readable medium described herein, transmitting the instruction may include operations, features, means, or instructions for transmitting instructions for the UE to switch from a first semi-static state to a second semi-static state, where the instructions for the UE to switch to the second semi-static state conveys the instruction to apply the digital post distortion model to the FDM downlink communications.

In some examples of the method, apparatuses, and non-transitory computer-readable medium described herein, transmitting the instruction may include operations, features, means, or instructions for transmitting radio resource control signaling one or more parameters for the UE, where at least one of the one or more parameters may be set to a value that conveys the instruction to apply the digital post distortion model to the FDM downlink communications.

In some examples of the method, apparatuses, and non-transitory computer-readable medium described herein, the indication of the instantaneous gain may be transmitted via one or more of a downlink control information, a data channel, a dedicated channel, or a combination thereof.

DETAILED DESCRIPTION

Figure 1:
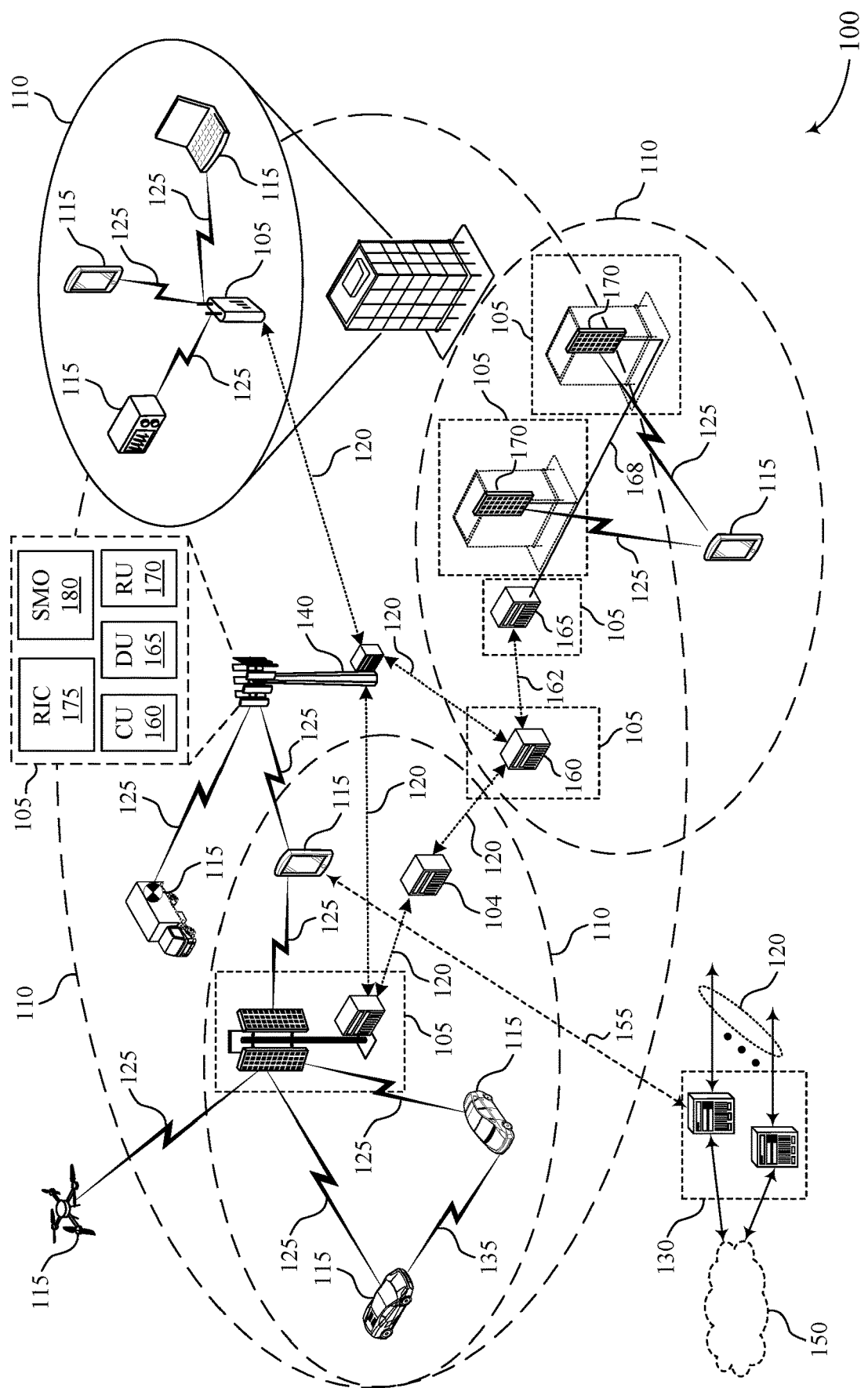
FIG. 1 illustrates an example of a wireless communications system that supports instantaneous amplitude gain side information for a multiplexed signal in accordance with one or more aspects of the present disclosure.

Wireless networks may use orthogonal frequency division multiple access (OFDMA) techniques for communications within the network. OFDMA techniques generally increase the peak to average power ratio (PAPR) relative to single carrier techniques. PAPR may increase further at higher orders of modulation. Increased PAPR can cause high power consumption at power amplifiers and low power efficiency.

A wireless network may utilize multiplexing where multiple messages for different user equipment (UE) are encoded onto the same signal. Signal manipulation techniques (such as clipping, filtering, and the like) may be utilized to reduce PAPR, which may introduce distortion in the communications (e.g., the signal or waveform carrying the wireless communications over frequency resources) corresponding to amplitude distortion. Similarly, power reduction techniques, such as envelope tracking at the power amplifier, can also introduce distortion in the communications (e.g., for the resulting amplitude modulated signal). Corresponding corrections can then be made to the signal at a receiving device (e.g., a UE) to account for this distortion and enable the receiving device to recover data from the signal. Conventional networks enable a UE to perform these corrections by signaling information to the UE about the signaling to other users (e.g., devices such as other UEs) sharing a band with the UE, the resources allocated to the other devices, the modulation scheme used with the other devices, the pilot structure used with the other devices, along with other relevant parameters. From this information, a UE may determine and compensate for distortion to the combined signal over the shared band. However, this process requires extensive signaling and also increased processing loads on the UE as each UE must process the allocations of each UE (and resulting impact on the signal) before the UE can recover its own data message.

Accordingly, the described techniques provide for signaling a compressed instantaneous gain to a UE, where the UE is able to recover its data message from a frequency division multiplexed (FDM) downlink communications using the compressed indication (e.g., rather than the UE being configured with and calculating the allocation for every other UE with information multiplexed into the downlink communications). For example, the transmitting device (e.g., UE or network entity) may identify or otherwise determine an instantaneous gain for the FDM communications. Broadly, the instantaneous gain may correspond to amplitude distortion of the communications (e.g., an amplitude distortion that exceeds a defined, signaled, or standardized threshold). For example, the power amplifier (PA) of the transmitting device may distort the communications (e.g. the waveform or signal carrying the FDM downlink communications), to some degree, using envelope tracking. Envelope tracking may include the power supply of the PA being adjusted in real time based on the instantaneous amplitude of the signal. Envelope tracking, for implementation reasons, is often made bandlimited, by filtering the instantaneous signal amplitude for example. This might introduce an amplitude distortion of the signal at the PA output when the power supply is below the required level for the instantaneous (wideband) signal amplitude. The amplitude distortion can be described as an instantaneous gain modulating the transmitted signal. For example, one or more time periods of the PA generating the signal may have an instantaneous gain that introduces amplitude distortion into the waveform or signal carrying the FDM downlink communications.

The transmitting device may transmit an indication of the instantaneous gain to the UE. For example, the indication of the instantaneous gain may be for the amplitude distortion associated with the FDM communications allocated to the UE. The UE may receive the FDM downlink communications from the transmitting device over frequency resources (e.g., the signal or waveform carrying the FDM downlink communications over the allocated to the UE) and apply a digital post distortion model to the signal according to the instantaneous gain (e.g., based on the amplitude distortion of the envelope). This compressed indication of the instantaneous gain for the UE (e.g., rather than being informed of the other allocated UEs, their allocation and pilot structures) may be used to decode its message from the FDM downlink communications.

Aspects of the disclosure are initially described in the context of wireless communications systems. Aspects of the disclosure are further illustrated by and described with reference to apparatus diagrams, system diagrams, and flowcharts that relate to instantaneous amplitude gain side information for a multiplexed signal.

FIG. 1 illustrates an example of a wireless communications system 100 that supports instantaneous amplitude gain side information for a multiplexed signal in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support instantaneous amplitude gain side information for a multiplexed signal as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive, from a transmitting device, an indication of an instantaneous gain associated with an amplitude distortion associated with FDM downlink communications to the UE 115 from the transmitting device. The instantaneous gain may be specific to the UE 115 (e.g., applicable to transmissions to the UE 115 over frequency resources allocated to the UE in a wideband but not applicable to transmissions to other UEs occurring at the same time over different frequency resources within the wideband). The UE 115 may receive the FDM downlink communications from the transmitting device over frequency resources allocated to the UE, wherein receiving the FDM downlink communications comprises applying a digital post distortion model to the downlink communications according to the instantaneous gain.

A transmitting device (e.g., a UE 115 and/or network entity 105) may transmit, to a UE 115, an indication of an instantaneous gain associated with an amplitude distortion associated with FDM downlink communication to the UE 115 from the transmitting device over frequency resources allocated to the UE 115. The transmitting device may transmit the FDM downlink communication to the UE 115 over the frequency resources allocated to the UE 115, and the UE 115 may apply a digital post distortion model to the FDM downlink communication to compensate for the instantaneous gain in receiving the transmission.

Figure 2:
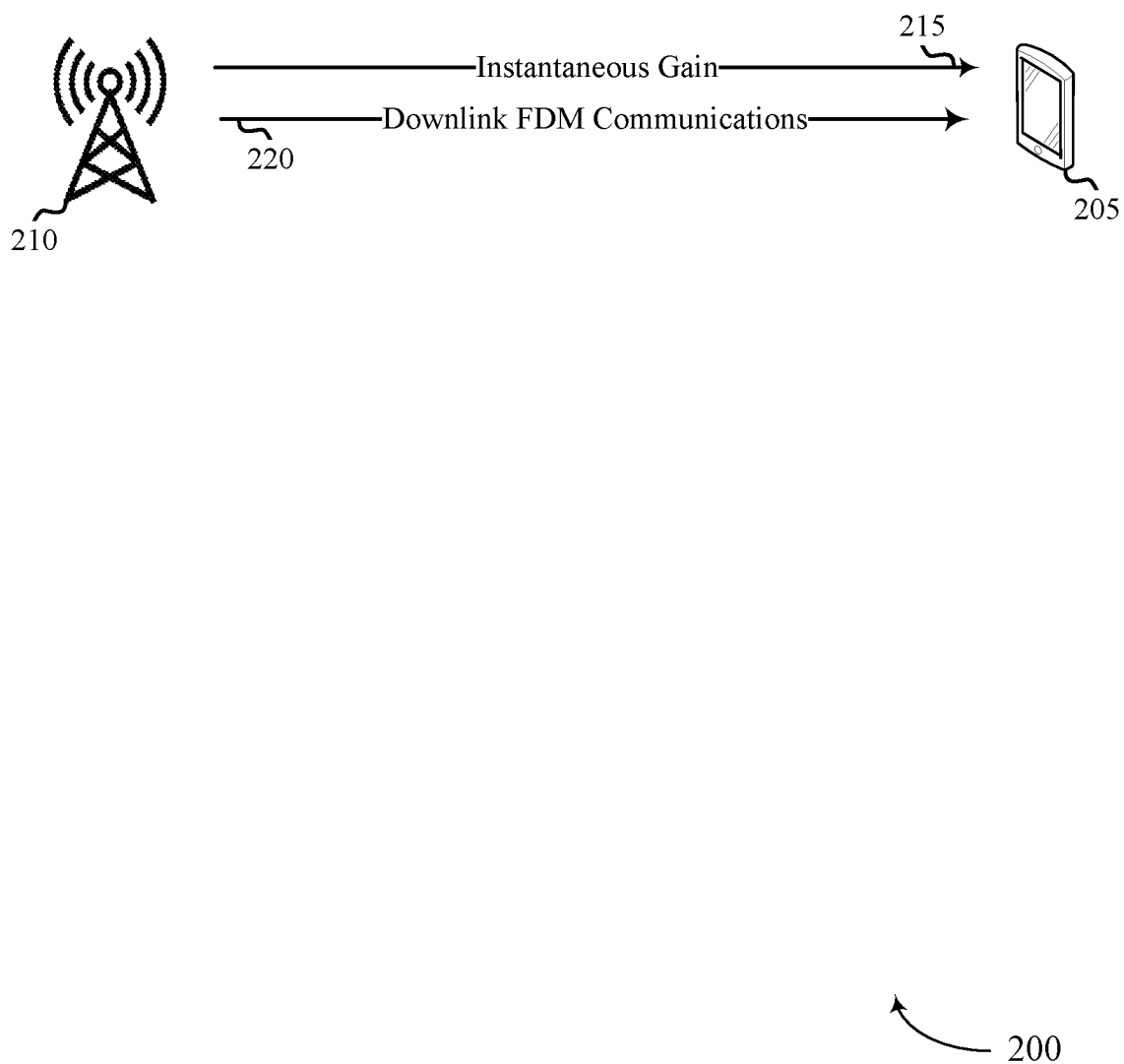
FIG. 2 illustrates an example of a wireless communications system that supports instantaneous amplitude gain side information for a multiplexed signal in accordance with one or more aspects of the present disclosure.

FIG. 2 illustrates an example of a wireless communications system 200 that supports instantaneous amplitude gain side information for a multiplexed signal in accordance with one or more aspects of the present disclosure. Wireless communications system 200 may implement aspects of wireless communications system 100. Wireless communications system 200 may include a UE 205 and/or a network entity 210, which may be examples of the corresponding devices described herein. The network entity 210 is generally illustrated to show an example of the techniques described herein in terms of downlink communications. However, it is to be understood that the transmitting device (e.g., the network entity 210, in this example) may be implemented by another UE, such as during sidelink communications and/or during uplink communications.

The use of OFDMA in transmissions by the network entity 210 may have numerous advantages, such as enabling simple channel estimation at the receiver device and flexibility in utilizing the available resources (e.g., time, frequency, spatial, or code resources). However, these advantages may come at the cost of an increased signal PAPR in comparison to single carrier techniques. In some networks, higher-order modulation constellations may also be used (e.g., 256 quadrature amplitude modulation (QAM), 1024 QAM, or even higher) in communications between the network entity 210 and the UE 205. However, the combination of high PAPR signals and high signal quality (e.g., low error vector magnitude (EVM)) required for these high modulations may result in poor utilization of the current PAs, which may result in high power consumption by the PAs and low power efficiency.

Some components of PAPR and power reduction techniques can be modeled as an instantaneous gain modulating the signal amplitude (envelope modulation). In these cases, the output of the system can be modeled as y(t)=g(t)·x(t) ={g(t). |x(t)|}·exp (i∠(x(t))), where x(t)=|x(t)|·exp (i∠(x(t))) represents the input signal with envelope |x(t)| and phase ∠(x(t)), and g(t) is the instantaneous gain (real, positive) modulating the envelope. Some examples of such envelope tracking techniques for such components include, but are not limited to Bandlimited Envelope Tracking, Hard clipping for PAPR reduction, and AM/AM PA models (e.g., Rapp model).

To save PA power and enable more power efficient operating modes, various PA power supply adaptation modes may be used for communications between network entity 210 and UE 205. In the envelope tracking method, the power supply of the PA closely follows the envelope of the instantaneous signal (e.g., generally a preferred method in terms of power efficiency). That is, envelope tracking techniques generally include, in real time, adjusting the power being supplied to the PA (e.g., from the power supply) such that the supplied power closely tracks the envelope of the signal or waveform being generated (e.g., in terms of amplitude) to improve efficiency.

However, one drawback to envelope tracking techniques is that it is limited to small bandwidth channels due to the limited ability of the envelope tracking circuitry to follow a fast changing envelope (e.g., the supplied power cannot be varied fast enough to follow the amplitude of the envelope being generated). Therefore, envelope tracking techniques may be limited for the large bandwidth signals used in 5G NR and later standards.

Moreover, multiplexing techniques may include a transmitting device multiplexing (e.g., FDM) N users (e.g., UEs) onto a single transmission (e.g., an FDM downlink transmission), where N is a positive integer. The composite transmit signal x (e.g., the multiplexed signal or waveform carrying data or information for multiple receiving devices) may be shown as $x=\Sigma_j x_j$, (where $x_j$ is the transmit signal for user j) and is transmitted through a PA whose power supply is modulated by an envelope tracking circuitry. As the response of the envelope tracking should be bandwidth limited, the instantaneous envelope of the combined signal cannot be used directly to modulate the PA power, and some manipulation may be done on the envelope tracking circuitry input and/or output signal to make it bandlimited. Such manipulation may include filtering the input signal, filtering the output envelope, among others. This results in distortion of the output signal when the used envelope response is lower than the actual envelope.

The PA can be modeled as a hard clipper in this example, resulting in an output signal of: y(t)=min (|x(t)|, $E_{comb}$(t)) exp (i∠(x(t))), where ∠(x) is the angle of x, and $E_{comb}$ (t) is the signal used to modulate the PA input power (e.g., it depends on |x(t)|). The PA output at time t can also be described as $$y(t) = \min(|x(t)|, E_{comb}(t)) \cdot \frac{x(t)}{|x(t)|} = g_{|x|}(t) \cdot x(t),$$

where $$g_{|x|}(t) = \begin{cases} \frac{E_{comb}(t)}{|x(t)|} & E_{comb}(t) < |x(t)| \\ 1 & \text{otherwise} \end{cases} \text{(e.g.,}$$

it depends on the envelope of the combined signal (|x(t)|). That is, the hard clipper may include, if the used combined envelope response ($E_{comb}$) is larger than the instantaneous signal envelope—no distortion occurs. Otherwise, the signal's amplitude is hard clipped to the combined envelope response.

Accordingly, the amplitude distortion sources for the signal or waveform carrying the communications may be based on one or more clipping methods. Example's may include, but are not limited to, a hard clipping for crest factor reduction (CFR). The CFR method is a common method for PAPR reduction performed by clipping (e.g., amplitude limit) the input signal when its amplitude exceeds a certain threshold (e.g., a maximum allowable amplitude). In this CFR method, the output signal can be expressed as y=min (|x(t) |, $A_{max}$) exp (i∠(x(t))), where $A_{max}$ is the maximum allowed amplitude.

The CFR output at time t can also be described as:

$$y(t) = \min(|x(t)|, A) \cdot \frac{x(t)}{|x(t)|} = g_{|x|}(t) \cdot x(t),$$

where $$g_{|x|}(t) = \begin{cases} \frac{A}{|x(t)|} & |x(t)| > A \\ 1 & \text{otherwise} \end{cases}$$

depends on the envelope of the combined signal.

Accordingly, the amplitude modulation AM/AM PA models may commonly be used to describe the PA output in the non-linear range. For these types of PA models, the output can also be expressed as an instantaneous gain modulating the input signal's amplitude. For example, the Rapp model describes the PA output signal as:

$$y(t) = \frac{G}{\left\{1 + \left|\frac{x(t)}{X_{sat}}\right|^{2\sigma}\right\}^{1/2\sigma}} \cdot x(t),$$

where G is the small signal gain, $x_{sat}$ is the saturation value, and o is a positive smoothing factor. This PA response can also be described as: $y(t)=g_{|x|}(t) \cdot x(t)$, where $$g_{|x|}(t) = \frac{G}{\left\{1 + \left|\frac{x(t)}{X_{sat}}\right|^{2\sigma}\right\}^{1/2\sigma}}$$

depends on the envelope of the combined signal (|x(t)|).

As the transmitter's response depends on the envelope of the combined OFDMA signal, each receiving device (e.g., each UE) may need the information on all other users multiplexed with that receiving device to reconstruct the full OFDMA signal and then recover its message. This approach may involve the network signaling to each receiving device (e.g., each UE) information about the other receiving devices that are multiplexed with that receiving device. This information may include resource allocation, modulation, pilot structure, and other information about the other receiving devices applicable to reconstructing the full OFDMA signal. Using this signaled information, user (e.g., receiving device or UE) i can, for example, use digital post distortion (DPOD) model correction to remove the envelope distortion (e.g., the amplitude distortion) from the signal and successfully decode the signal. However, the conventional use of DPOD involves each receiving device processing the allocations (e.g., channel estimations, hard slicing, and other such reconstruction operations) of all other UEs included in the multiplexed signal in addition to its own. This adds significant complexity to the UE receiving FDM communications, resulting in inefficiency and complexity. Such techniques are worsened for a UE with a smaller allocation relative to the other UEs.

Accordingly, aspects of the techniques described herein provide various mechanisms for PA efficiency enhancements (e.g., such as DPOD and envelope tracking) for frequency domain multiplexed users, without requiring each user to receive and process the information for all frequency domain multiplexed users. Broadly, the amplitude modulated transmitter output (e.g., the output of the transmitter, which includes the signal or waveform carrying the frequency domain multiplexed communications) may be modeled as: $y(t)=g_{1x1}(t)x(t)=\Sigma_{(j=1)}^{N}(g_{1x1}(t) \cdot x_j(t))$, where $g_{1x1}$ (t) is the instantaneous real gain (or envelope distortion) at time t, $x=\Sigma_j x_j$ is the composite transmit signal and x is the transmit signal for user j.

Accordingly, at 215 the network entity 210 may transmit or otherwise provide (and the UE 205 may receive or otherwise obtain) an indication of an instantaneous gain associated with an amplitude distortion associated with FDM downlink communications to the UE 205. That is, the transmitting device (e.g., the network entity 210 in this example) may determine the instantaneous gain and a compressed version of $g_{1x1}(t)$ (e.g., the instantaneous gain) may be transmitted to each receiving device (e.g., each UE receiving the FDM downlink communications).

In some examples, the instantaneous envelope gain (e.g., the instantaneous gain, $g_{1x1}(t)$) may be transmitted using the absolute value of the instantaneous gain or may be compressed in order to be sent more efficiently. The compression techniques may consider certain envelope distortion properties to determine the optimal compression scheme. In most cases, the amplitude distortion (e.g., associated with the instantaneous gain) may have a high correlation in the time domain, meaning that adjacent samples may have similar values. For some distortion sources (e.g., such as CFR or envelope tracking), the distortion may be zero or close to zero (e.g., $g_{1x1}(t) \approx 1$) for a large portion of the time. Small values of distortion can sometimes be ignored, either for all users, or depending on the user's requirements (e.g., from a signal-to-noise (SNR) operational perspective, for example).

Accordingly, different compression schemes may be applied when considering such scenarios. One example may include sending a list of positions (time windows) and values g(t) (or 1−g(t)) where the amplitude distortion is high. The information may include the time windows (start time, length time or duration) during which the gain values can be sent using differential representation, for example.

As discussed, up to a certain level of amplitude distortion can be acceptable (e.g., depending on the users' requirements). Accordingly, according to the user's requirements (e.g., SNR), the list size (e.g., the number of indicated instantaneous gains) may be limited to M dominant positions, bringing the distortion level to the acceptable level. The information can be sent according to the UE with the highest requirements, or incrementally where a user uncompresses only the information it needs (saving the receiver's resources). The instantaneous gain information can be compressed using methods such as wavelet compression, which take advantage of the time correlation property.

At 220, the network entity 210 may transmit or otherwise provide (and the UE 205 may receive or otherwise obtain) the FDM downlink communications. In some aspects, the FDM downlink communications may be received over frequency resources allocated to the UE 205 (as well as other UE multiplexed onto the FDM communications). In some examples, the FDM downlink communications may be transmitted to the UE 205 and other included UEs using the same transmit beam of the network entity 210 and/or using more than one transmit beam. For example, the transmit beam used for transmitting the FDM communications to the UE 205 may be within a threshold transmission angle relative to the transmit beam used to transmit the FDM communications to the other UE included in the FDM communications.

The UE 205 may apply DPOD techniques to the frequency division multiplexed downlink communications according to the instantaneous gain. That is, each user, after extracting its own allocation, may treat the transmit response as the instantaneous gain multiplying only its own signal: $y_i(t)=g_{|x|}(t) \cdot x_i$. Thus, the UE 205 may use the instantaneous gain to estimate the channel being used for FDM downlink communications, estimate one or more constellation points of signals associated with the channel, equalize the signals, estimate non-linearities of the signals, and/or correct for the non-linearities.

Thus, using the indicated instantaneous gain, each UE is able to reconstruct its own allocation without requiring the full information and processing of the other UE's frequency division multiplexed communications (the additional UE(s)). Thus, each UE may compensate for the resulting distortions (e.g., due to limited bandwidth envelope tracking, for example) inside its own allocation, using DPOD mode techniques on the receiver side.

In some examples, these techniques may be based on the capability of the UE 205. For example, the UE 205 may transmit a UE capability message (or UE assistance information message) indicating that the UE 205 supports applying the DPOD technique based on the indicated instantaneous gain. Accordingly, the network entity 210 may, based on the supported UE capability, determine and signal the instantaneous gain to the UE to aid in data message recovery.

In some examples, the network entity 210 may request/activate frequency division multiplexed communications using the indicated instantaneous gain. For example, the network entity 210 may transmit (and the UE 205 may receive) instructions to apply the DPOD at the UE 205. In some examples, the instructions may be received in the DCI scheduling transmission of the FDM downlink communications to the UE 205 (e.g., requested per downlink allocation, indicated in the DCI). In some examples, the instructions may be turned on or off semi-statically. For example, the network entity 210 may transmit instructions to the UE 205 to switch from a first semi-static state to a second semi-static state. The indication to switch states may instruct the UE 205 to apply the DPOD technique (e.g., in the second semi-static state) during frequency division multiplexed communications or not to apply the DPOD technique (e.g., in the first semi-static state) during the frequency division multiplexed communications.

In some examples, the instructions to apply or not to apply may be based on (pre)configured rules, parameters, settings, and so forth, which may be signaled to the UE 205 using RRC signaling of such parameter(s). For example, the instructions to apply the DPOD may be based on the transmission bandwidth (e.g., a first bandwidth instructs the UE 205 to apply DPOD), on the modulation (e.g., a first MCS instructs the UE 205 to apply DPOD), or any other setting, parameter, or allocation, as signaled by the network entity 210. The instructions may be received over any number of wireless channels, such as a DCI, a control channel (e.g., physical sidelink/uplink/downlink control channel (PxCCH)), a data channel (e.g., a physical sidelink/uplink/downlink shared channel (PxSCH), a dedicated channel, or any other channel used to convey the instructions implicitly or explicitly.

Figure 3:
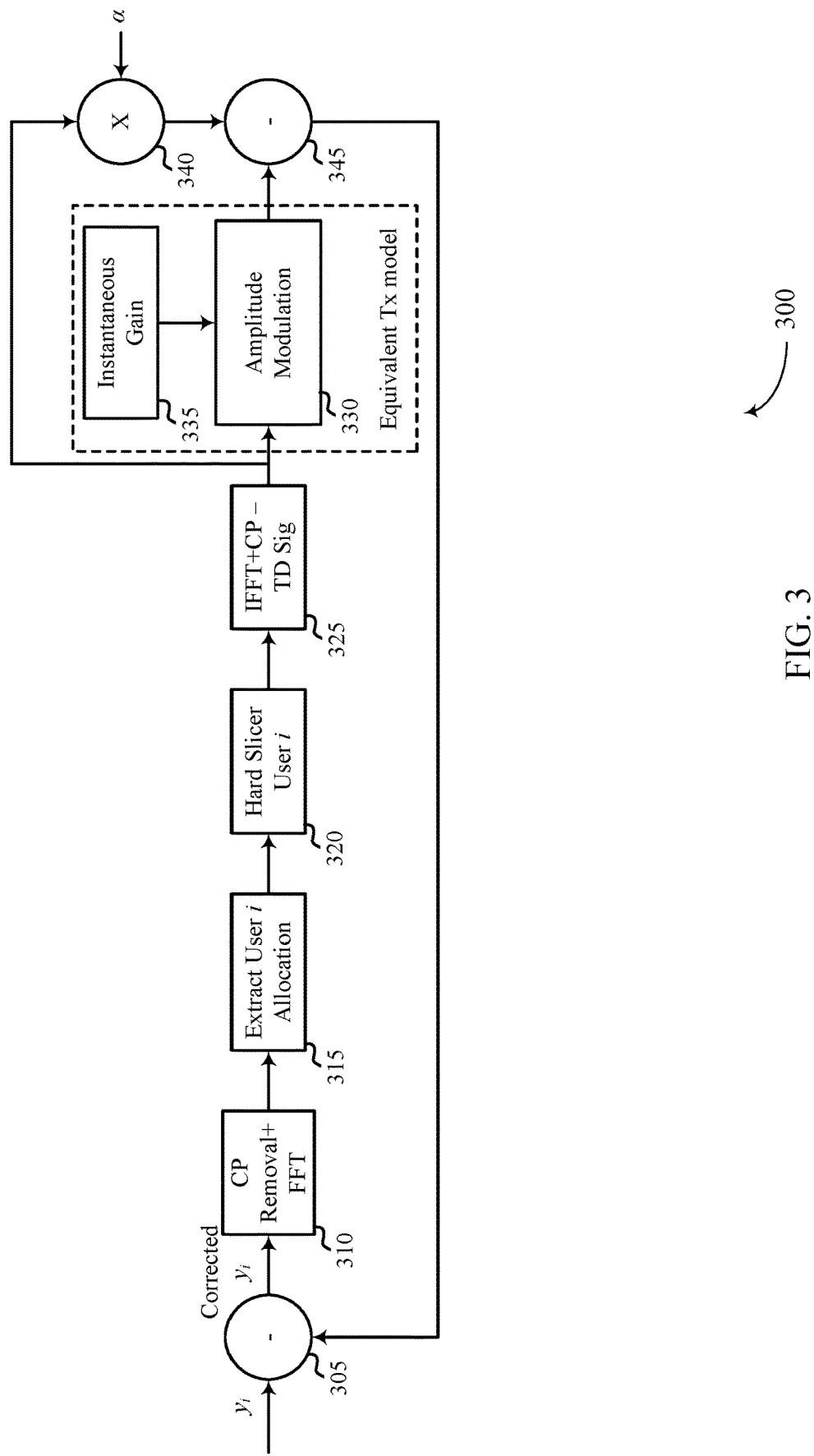
FIG. 3 illustrates an example of a receive configuration that supports instantaneous amplitude gain side information for a multiplexed signal in accordance with one or more aspects of the present disclosure.

FIG. 3 illustrates an example of a receive configuration 300 that supports instantaneous amplitude gain side information for a multiplexed signal in accordance with one or more aspects of the present disclosure. Receive configuration 300 may implement aspects of wireless communications systems 100 and/or 200. Aspects of receive configuration may be implemented at or implemented by a receiving device, such as a UE and/or network entity, which may be examples of the corresponding devices described herein. Receive configuration 300 broadly illustrates an example of a receive DPOD correction algorithm applied to communications according to the techniques discussed herein.

As discussed above, aspects of the techniques described herein provide for providing an indication of the instantaneous gain to be use for DPOD correction of an FDM communications, such as a FDM downlink communications. The FDM downlink communications may include data messages intended for the UE and one or more additional UE multiplexed onto the same signal or waveform. A transmitting device (e.g., UE and/or network entity) may identify or otherwise determine the instantaneous gain based on the amplitude distortion of a signal or waveform used to carry FDM downlink communications over frequency resources allocated to the UE. The amplitude distortion may be due to envelope tracking techniques (and/or other issues) arising in a distortion (e.g., clipping) of the FDM signal or waveform. The instantaneous gain may be signaled to the UE (e.g., in a DCI scheduling the communications, using data/control channel signaling, and/or using a dedicated channel).

The absolute value and/or a relative value of the instantaneous gain may be signaled to the UE and/or may be signaled in a compressed form. That is, one or more quantization schemes or tables may be applied to the instantaneous gain indication such that fewer bits are used to convey the indication. In some examples, a bit, flag, field, and/or parameter may be indicated that is set to a value corresponding to a row within a (pre)configured table. The UE may use the indication along with the table to determine the instantaneous gain(s) being signaled.

The indication of the instantaneous gain may carry or otherwise convey an indication of a single instantaneous gain which the UE may use to identify the amplitude distortion of the FDM downlink communications. The UE may apply the DPOD to the signal or waveform carrying the FDM downlink communications and decode the message for the UE. In some aspects, a timing parameter may be associated with and indicated for the instantaneous gain, which may signal the timing component of the signal or waveform that is amplitude distorted. For example, the transmitting device may indicate a start time, end time, duration, or other related timing information for the amplitude distortion in the signal or waveform.

The indication of the instantaneous gain may carry or otherwise convey an indication of a set of instantaneous gains for a set of time periods, each instantaneous gain in the set associated with a corresponding time period. The UE may use the indication to identify or otherwise determine the amplitude distortions for the time periods in order to apply DPOD correction to decode the UE's message. That is, the UE may identify or otherwise determine each amplitude distortion in a set of amplitude distortions using the corresponding instantaneous gain for the corresponding time period. The set of time periods may again and for each instantaneous gain/amplitude distortion indicate various timing information to the UE to aid in DPOD application and message recovery.

In some examples, the transmitting device may indicate the instantaneous gain(s) for amplitude distortion that satisfies an amplitude distortion threshold level (e.g., each instance where the amplitude of the signal or waveform has been distorted at least the threshold amount).

Receiving configuration 300 illustrates a non-limiting example of a configured suitable for use by the UE (or any other receiving device) to receive the signal or waveform and use the indicated instantaneous gain when applying DPOD to decode its message from the FDM downlink communications. That is, receive configuration 300 illustrates an example of a receiver digital post distortion correction algorithm utilized according to the techniques described herein. Generally, this may include the UE receiving an indication of the compressed instantaneous gain and reconstructing the uncompressed $g_{1xl}$. With the indicated instantaneous gain $g_{1xl}$, each UE (e.g., by extracting only the UE's allocation from the FFT output) can process inly its allocation $-y_i$, disregarding the other allocated UEs. Each UE models its received signal (e.g., after channel estimation and correction) as $y_i(x_i)=ax_i+d_i$.

Generally, receive configuration 300 illustrates a non-limiting example of a DPOD Bussgang-based iteration approach for estimating $x_i$ and $d_i$ based on $y_i(x_i)=ax_i+d_i$. The Bussgang based iterations may be used to estimate $x_i$ and $d_i$, iteratively removing the distortion caused by the distortion gain $g_{1xl}(t)$. When reconstructing the transmitted signal (e.g., the signal or waveform carrying the FDM communications), the UE may use the received indication of the instantaneous gain $g_{1xl}$ so it doesn't have to reconstruct the entire transmitted signal $x(t)$ to recover its message.

Accordingly, an input $y_i$ may be provided to a subtractor 305. The subtractor 305 may also be provided with a feedback input $\hat{d}_i$ used to output a corrected $y_i$ (e.g., by subtracting the feedback from the input). That is, $y_i^{corrected}=y_i-\hat{d}_i$. The output of the subtractor 305 (e.g., $y_i^{corrected}$) may be provide to a CP removal+FFT 310, which may remove the cyclic prefix (CP) samples and perform Fast Fourier Transform (FFT) (e.g., Fast Fourier convert the $y_i^{corrected}$). The output of the CP removal+FFT 310 may be provided to an extractor 315 where the UE extracts its allocation from $y_i^{corrected}$. The extracted UE's allocation is then provided to a slicer 320 that generates estimated constellation points output based on the extractor frequency domain resources for the UE. The output of the slicer 320 may be provided to a IFFT+CP addition 325. In some aspects, the IFFT+CP addition 325 may create a time domain (TD) signal by applying IFFT and adding the CP samples to the output of the slicer 320 (e.g., recreate the time domain signal or waveform corresponding to the UE's allocation). In some aspects, the output of the IFFT+CP addition 325 may be represented as $\hat{x}_i(t)$. The slicing/recreation of the time domain signal corresponding to the UE's allocation may be based on $\hat{x}_i=$ifft(argmin$_{x_i}$|FFT$(y_i^{corrected}))-$FFT$(ax_i)|^2)$. The UE may include an equivalent transmitter model by using the instantaneous gain 335 ($g_{1xl}(t)$) indicated from the transmitting device to provide input to an AM 330 along with the output of the IFFT+CP addition 325 ($\hat{x}_i(t)$). That is, the AM 330 may create the amplitude modulated signal using the UE's allocation and the indicated instantaneous gain (e.g., $\hat{x}_i(t)g_{1xl}(t)$).

The Bussgang coefficient $\alpha$ may be provided to a multiplier 340, which receives the UE's reconstructed allocation (ex $\hat{x}_i(t)$) provided by the IFFT+CP addition 325. The multiplier 340 uses an input corresponding to the output of the IFFT+CP addition 325 (e.g., ($\hat{x}_i(t)$) and scales it (multiply by), the Bussgang coefficient. The output of the multiplier 340 is provided to the input of the subtracter 345 along with the output of the AM 330. The subtracter 345 subtracts the multiplier 340 output from the AM 330 output to produce the estimated distortion signal ($\hat{d}_i$), which is used as a feedback to the subtractor 305. In some aspects, the distortion estimation may be based on $$\hat{d}_i = \text{equivalent}_{Tx_{model(\hat{x}_i)}} - \alpha\hat{x}_i.$$

Accordingly, receive configuration 300 illustrates a non-limiting example of a DPOD Bussgang-based iteration technique used for estimating the UE's allocation of FDM downlink communications using the instantaneous gain indicated from the transmitting device. The instantaneous gain may be leveraged to allow the UE to recreate it's portion of the signal or waveform carrying the FDM downlink communications without having to also recreate and then remove the portions of the signal or waveform carrying messages to the other UEs included in the FDM downlink communications. This may reduce overhead and complexity associated with the network performing FDM communications, which may improve overall communications within the wireless network.

Figure 4:
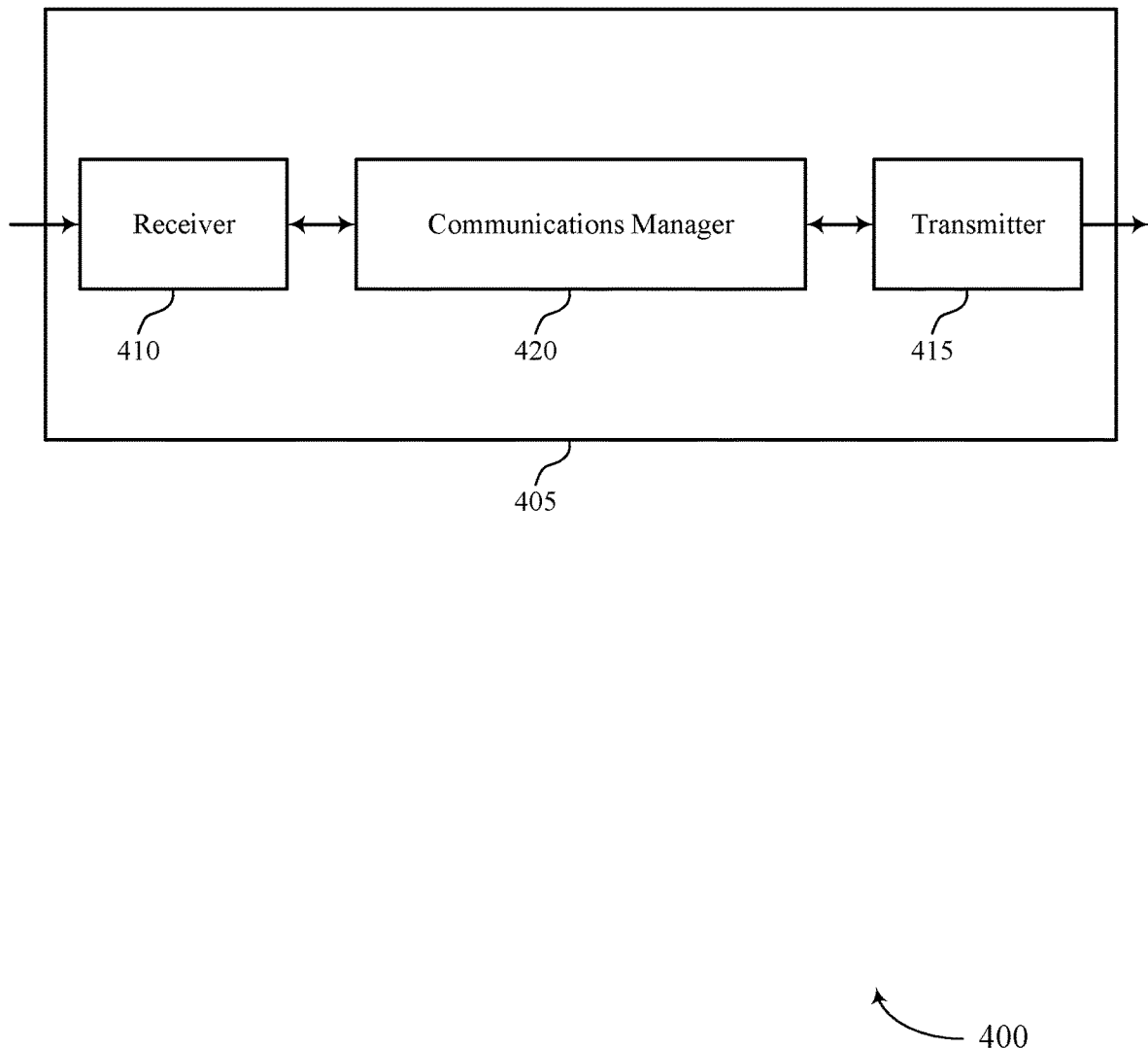
FIGS. 4 and 5 illustrate block diagrams of devices that support instantaneous amplitude gain side information for a multiplexed signal in accordance with one or more aspects of the present disclosure.

FIG. 4 illustrates a block diagram 400 of a device 405 that supports instantaneous amplitude gain side information for a multiplexed signal in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to instantaneous amplitude gain side information for a multiplexed signal). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to instantaneous amplitude gain side information for a multiplexed signal). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof may be examples of means for performing various aspects of instantaneous amplitude gain side information for a multiplexed signal as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 may be configured as or otherwise support a means for receiving, from a transmitting device, an indication of an instantaneous gain associated with an amplitude distortion associated with FDM downlink communications to the UE from the transmitting device. The communications manager 420 may be configured as or otherwise support a means for receiving the FDM downlink communications from the transmitting device over frequency resources allocated to the UE, where receiving the FDM downlink communications includes applying a digital post distortion model to the frequency division multiplexed downlink communications according to the instantaneous gain.

Additionally, or alternatively, the communications manager 420 may support wireless communications at a transmitting device in accordance with examples as disclosed herein. For example, the communications manager 420 may be configured as or otherwise support a means for transmitting, to a UE, an indication of an instantaneous gain associated with an amplitude distortion associated with FDM downlink communication to the UE from the transmitting device. The communications manager 420 may be configured as or otherwise support a means for transmitting the FDM downlink communication to the UE over frequency resources allocated to the UE, where the UE applies a digital post distortion model to the FDM downlink communication according to the instantaneous gain.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for signaling an indication of an instantaneous gain associated with amplitude distortion of a signal or waveform carrying an FDM communications to one or more UE. The instantaneous gain indication may enable each UE to extract and reconstruct the portion of the signal or waveform carrying its allocated message, without having to receive and process the allocations for each UE included in the FDM communications.

Figure 5:
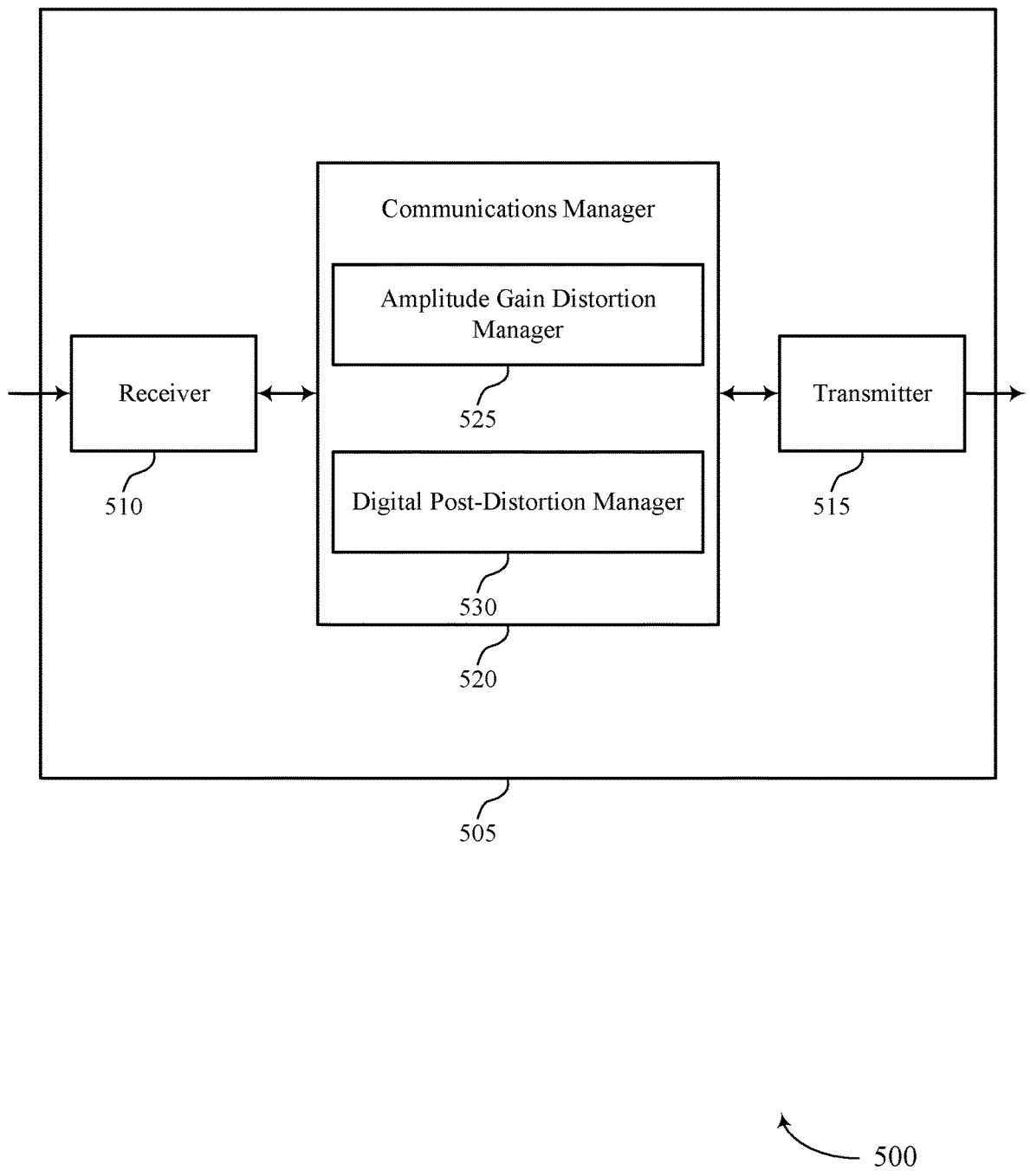

FIG. 5 illustrates a block diagram 500 of a device 505 that supports instantaneous amplitude gain side information for a multiplexed signal in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to instantaneous amplitude gain side information for a multiplexed signal). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to instantaneous amplitude gain side information for a multiplexed signal). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of instantaneous amplitude gain side information for a multiplexed signal as described herein. For example, the communications manager 520 may include an AM gain distortion manager 525 a digital post-distortion manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The AM gain distortion manager 525 may be configured as or otherwise support a means for receiving, from a transmitting device, an indication of an instantaneous gain associated with an amplitude distortion associated with FDM downlink communications to the UE from the transmitting device. The digital post-distortion manager 530 may be configured as or otherwise support a means for receiving the FDM downlink communications from the transmitting device over frequency resources allocated to the UE, where receiving the FDM downlink communications includes applying a digital post distortion model to the frequency division multiplexed downlink communications according to the instantaneous gain.

Additionally, or alternatively, the communications manager 520 may support wireless communications at a transmitting device in accordance with examples as disclosed herein. The digital post-distortion manager 530 may be configured as or otherwise support a means for transmitting, to a UE, an indication of an instantaneous gain associated with an amplitude distortion associated with FDM downlink communication to the UE from the transmitting device. The digital post-distortion manager 530 may be configured as or otherwise support a means for transmitting the FDM downlink communication to the UE over frequency resources allocated to the UE, where the UE applies a digital post distortion model to the FDM downlink communication according to the instantaneous gain.

Figure 6:
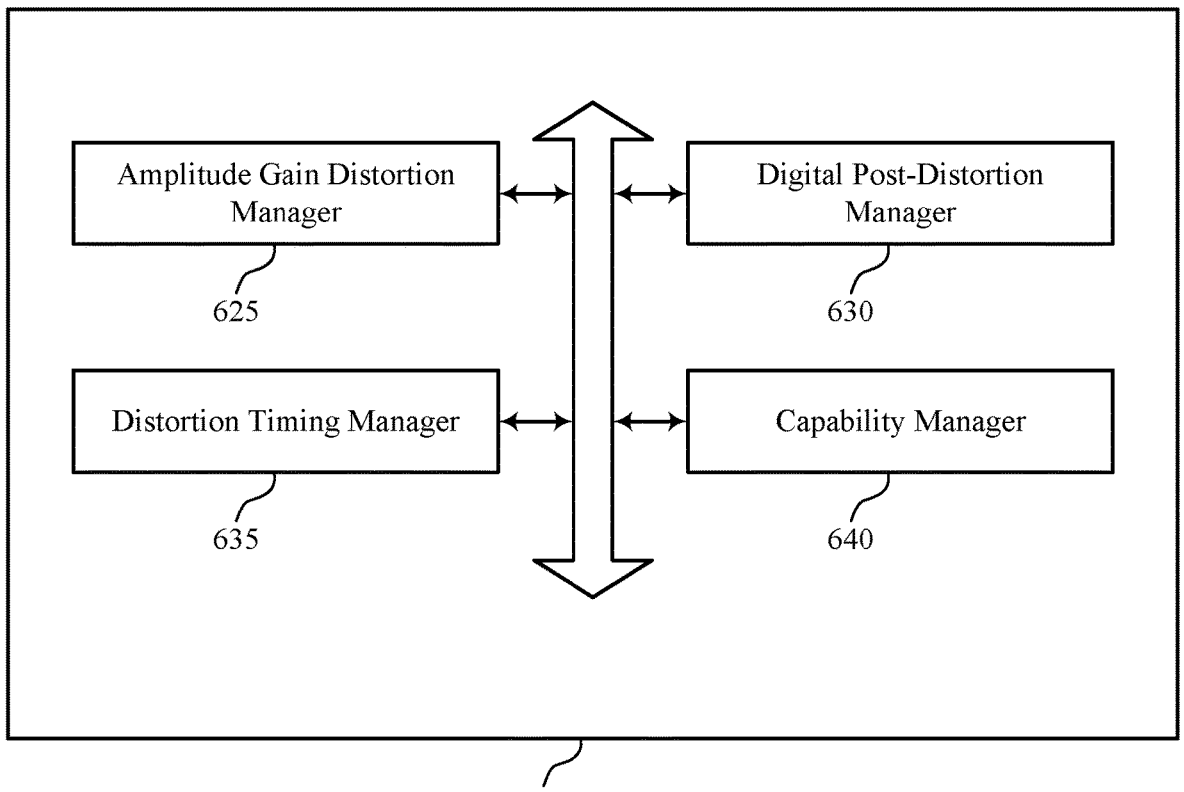
FIG. 6 illustrates a block diagram of a communications manager that supports instantaneous amplitude gain side information for a multiplexed signal in accordance with one or more aspects of the present disclosure.

FIG. 6 illustrates a block diagram 600 of a communications manager 620 that supports instantaneous amplitude gain side information for a multiplexed signal in accordance with one or more aspects of the present disclosure. The communications manager 620 may be an example of aspects of a communications manager 420, a communications manager 520, or both, as described herein. The communications manager 620, or various components thereof, may be an example of means for performing various aspects of instantaneous amplitude gain side information for a multiplexed signal as described herein. For example, the communications manager 620 may include an amplitude gain distortion manager 625, a digital post-distortion manager 630, a distortion timing manager 635, a capability manager 640, or any combination thereof. Each of these components may communicate, directly or indirectly, with one another (e.g., via one or more buses).

The communications manager 620 may support wireless communications at a UE in accordance with examples as disclosed herein. The amplitude gain distortion manager 625 may be configured as or otherwise support a means for receiving, from a transmitting device, an indication of an instantaneous gain associated with an amplitude distortion associated with FDM downlink communications to the UE from the transmitting device. The digital post-distortion manager 630 may be configured as or otherwise support a means for receiving the FDM downlink communications from the transmitting device over frequency resources allocated to the UE, where receiving the FDM downlink communications includes applying a digital post distortion model to the frequency division multiplexed downlink communications according to the instantaneous gain.

In some examples, the digital post-distortion manager 630 may be configured as or otherwise support a means for identifying, based on the instantaneous gain, the amplitude distortion associated with the FDM downlink communications, where the digital post distortion model is applied based on the instantaneous gain and the amplitude distortion. In some examples, the digital post-distortion manager 630 may be configured as or otherwise support a means for decoding a message for the UE from the FDM downlink communications based on applying the digital post distortion model.

In some examples, the distortion timing manager 635 may be configured as or otherwise support a means for identifying, based on the indication of the instantaneous gain, a set of amplitude distortions for a corresponding time period of a set of time periods of the FDM downlink communications, where the digital post distortion model is applied during the set of time periods. In some examples, the distortion timing manager 635 may be configured as or otherwise support a means for identifying each amplitude distortion in the set of amplitude distortions based on a corresponding instantaneous gain for the corresponding time period satisfying a threshold.

In some examples, the distortion timing manager 635 may be configured as or otherwise support a means for identifying the set of time periods based on a threshold number of amplitude distortions satisfying an amplitude distortion threshold level. In some examples, the distortion timing manager 635 may be configured as or otherwise support a means for identifying, based on the indication of the instantaneous gain, a start time, a duration, or a combination thereof, for each amplitude distortion of the set of amplitude distortions, where the set of time periods is based on the start time, the duration, or the combination thereof.

In some examples, the capability manager 640 may be configured as or otherwise support a means for transmitting a UE capability message indicating that the UE supports applying the digital post distortion model based on the instantaneous gain. In some examples, the capability manager 640 may be configured as or otherwise support a means for receiving an instruction to apply the digital post distortion model at the UE.

In some examples, to support receiving the instruction, the capability manager 640 may be configured as or otherwise support a means for receiving a downlink control information scheduling transmission of the FDM downlink communication to the UE, where the instruction to apply the digital post distortion model is conveyed in the downlink control information. In some examples, to support receiving the instruction, the capability manager 640 may be configured as or otherwise support a means for receiving instructions to switch from a first semi-static state to a second semi-static state, where the instructions to switch to the second semi-static state conveys the instruction to apply the digital post distortion model to the FDM downlink communications.

In some examples, to support receiving the instruction, the capability manager 640 may be configured as or otherwise support a means for receiving radio resource control signaling one or more parameters for the UE, where at least one of the one or more parameters is set to a value that conveys the instruction to apply the digital post distortion model to the FDM downlink communications. In some examples, the indication of the instantaneous gain is received via one or more of a DCI, a data channel, a dedicated channel, or a combination thereof. In some examples, the FDM downlink communications are multiplexed with one or more additional FDM downlink communications associated with one or more additional UEs. In some examples, the FDM downlink communications and the one or more additional FDM downlink communications are associated with a same transmit beam of the transmitting device.

In some examples, applying a digital post distortion model to the FDM downlink communications includes at least one of estimating a channel that includes allocations for the FDM downlink communications, estimating constellation points of signals associated with the channel, equalizing the signals, estimating non-linearities of the signals, correcting for the non-linearities of at least a portion of the signals, or a combination thereof.

Additionally, or alternatively, the communications manager 620 may support wireless communications at a transmitting device in accordance with examples as disclosed herein. In some examples, the digital post-distortion manager 630 may be configured as or otherwise support a means for transmitting, to a UE, an indication of an instantaneous gain associated with an amplitude distortion associated with FDM downlink communication to the UE from the transmitting device. In some examples, the digital post-distortion manager 630 may be configured as or otherwise support a means for transmitting the FDM downlink communication to the UE over frequency resources allocated to the UE, where the UE applies a digital post distortion model to the FDM downlink communication according to the instantaneous gain.

In some examples, the digital post-distortion manager 630 may be configured as or otherwise support a means for identifying the amplitude distortion associated with the FDM downlink communication, where the instantaneous gain is based on the amplitude distortion.

In some examples, the distortion timing manager 635 may be configured as or otherwise support a means for identifying a set of amplitude distortions for a corresponding time period of a set of time periods of the FDM downlink communications, where the instantaneous gain is based on the set of amplitude distortions. In some examples, the distortion timing manager 635 may be configured as or otherwise support a means for identifying each amplitude distortion in the set of amplitude distortions based on a corresponding instantaneous gain for the corresponding time period satisfying a threshold, where the instantaneous gain is based on the corresponding instantaneous gain for the corresponding time period.

In some examples, the distortion timing manager 635 may be configured as or otherwise support a means for identifying the set of time periods based on a threshold number of amplitude distortions satisfying a threshold. In some examples, the distortion timing manager 635 may be configured as or otherwise support a means for identifying a start time, a duration, or a combination thereof, for each amplitude distortion of the set of amplitude distortions, where the set of time periods is based on the start time, the duration, or the combination thereof.

In some examples, the capability manager 640 may be configured as or otherwise support a means for receiving a UE capability message indicating that the UE supports applying the digital post distortion model based on the instantaneous gain. In some examples, the capability manager 640 may be configured as or otherwise support a means for transmitting an instruction to apply the digital post distortion model at the UE. In some examples, to support transmitting the instruction, the capability manager 640 may be configured as or otherwise support a means for transmitting a downlink control information scheduling transmission of the FDM downlink communications to the UE, where the instruction to apply the digital post distortion model is conveyed in the downlink control information.

In some examples, to support transmitting the instruction, the capability manager 640 may be configured as or otherwise support a means for transmitting instructions for the UE to switch from a first semi-static state to a second semi-static state, where the instructions for the UE to switch to the second semi-static state conveys the instruction to apply the digital post distortion model to the FDM downlink communications. In some examples, to support transmitting the instruction, the capability manager 640 may be configured as or otherwise support a means for transmitting radio resource control signaling one or more parameters for the UE, where at least one of the one or more parameters is set to a value that conveys the instruction to apply the digital post distortion model to the FDM downlink communications. In some examples, the indication of the instantaneous gain is transmitted via one or more of a DCI, a data channel, a dedicated channel, or a combination thereof.

Figure 7:
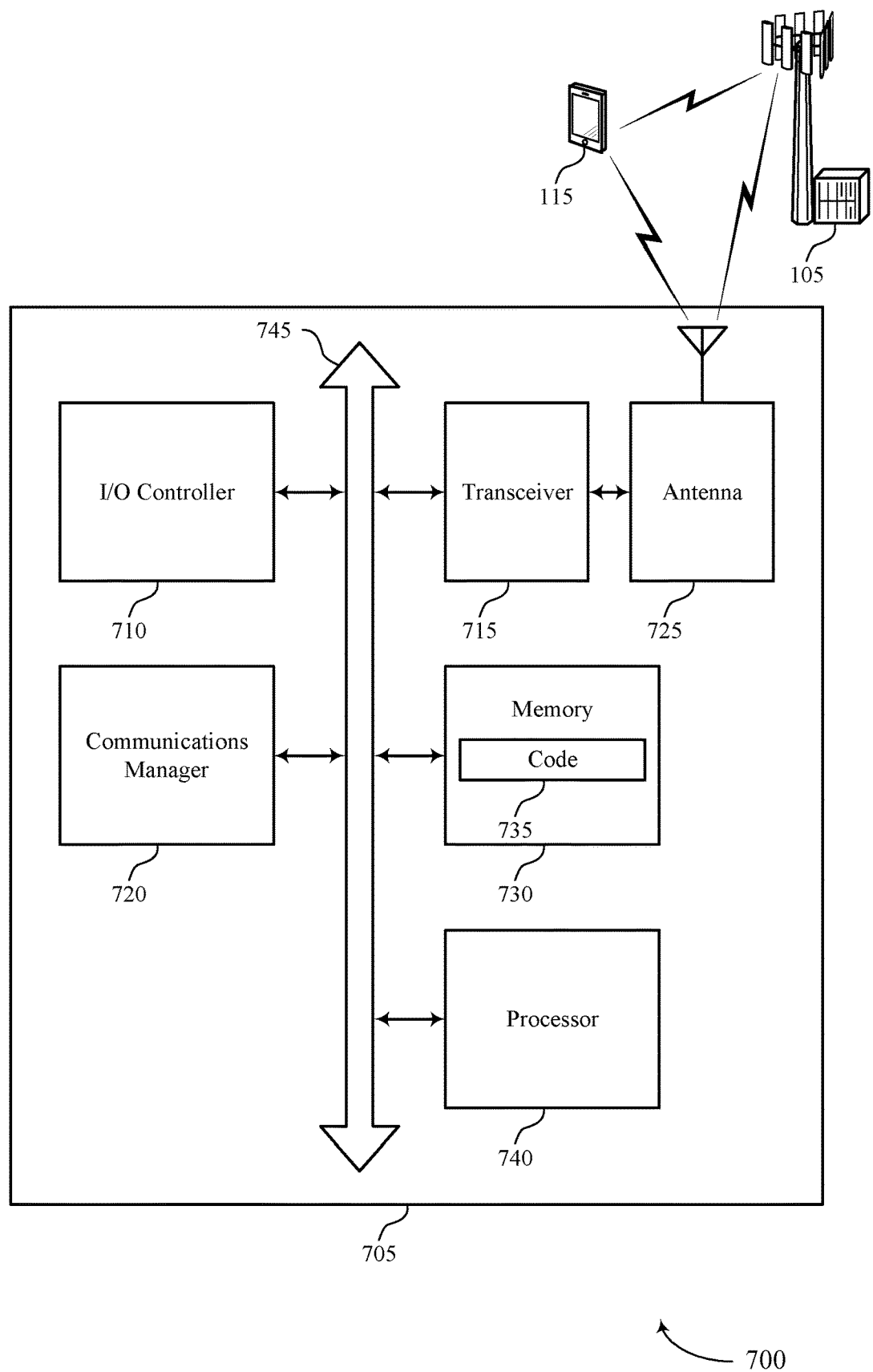
FIG. 7 illustrates a diagram of a system including a device that supports instantaneous amplitude gain side information for a multiplexed signal in accordance with one or more aspects of the present disclosure.

FIG. 7 illustrates a diagram of a system 700 including a device 705 that supports instantaneous amplitude gain side information for a multiplexed signal in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting instantaneous amplitude gain side information for a multiplexed signal). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a transmitting device, an indication of an instantaneous gain associated with an amplitude distortion associated with FDM downlink communications to the UE from the transmitting device. The communications manager 720 may be configured as or otherwise support a means for receiving the FDM downlink communications from the transmitting device over frequency resources allocated to the UE, where receiving the FDM downlink communications includes applying a digital post distortion model to the frequency division multiplexed downlink communications according to the instantaneous gain.

Additionally, or alternatively, the communications manager 720 may support wireless communications at a transmitting device in accordance with examples as disclosed herein. For example, the communications manager 720 may be configured as or otherwise support a means for transmitting, to a UE, an indication of an instantaneous gain associated with an amplitude distortion associated with FDM downlink communication to the UE from the transmitting device. The communications manager 720 may be configured as or otherwise support a means for transmitting the FDM downlink communication to the UE over frequency resources allocated to the UE, where the UE applies a digital post distortion model to the FDM downlink communication according to the instantaneous gain.

By including or configuring the communications manager 720 in accordance with examples as described herein, the device 705 may support techniques for signaling an indication of an instantaneous gain associated with amplitude distortion of a signal or waveform carrying an FDM communications to one or more UE. The instantaneous gain indication may enable each UE to extract and reconstruct the portion of the signal or waveform carrying its allocated message, without having to slice the allocations for each UE included in the FDM communications.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of instantaneous amplitude gain side information for a multiplexed signal as described herein, or the processor 740 and the memory 730 may be otherwise configured to perform or support such operations.

Figure 8:
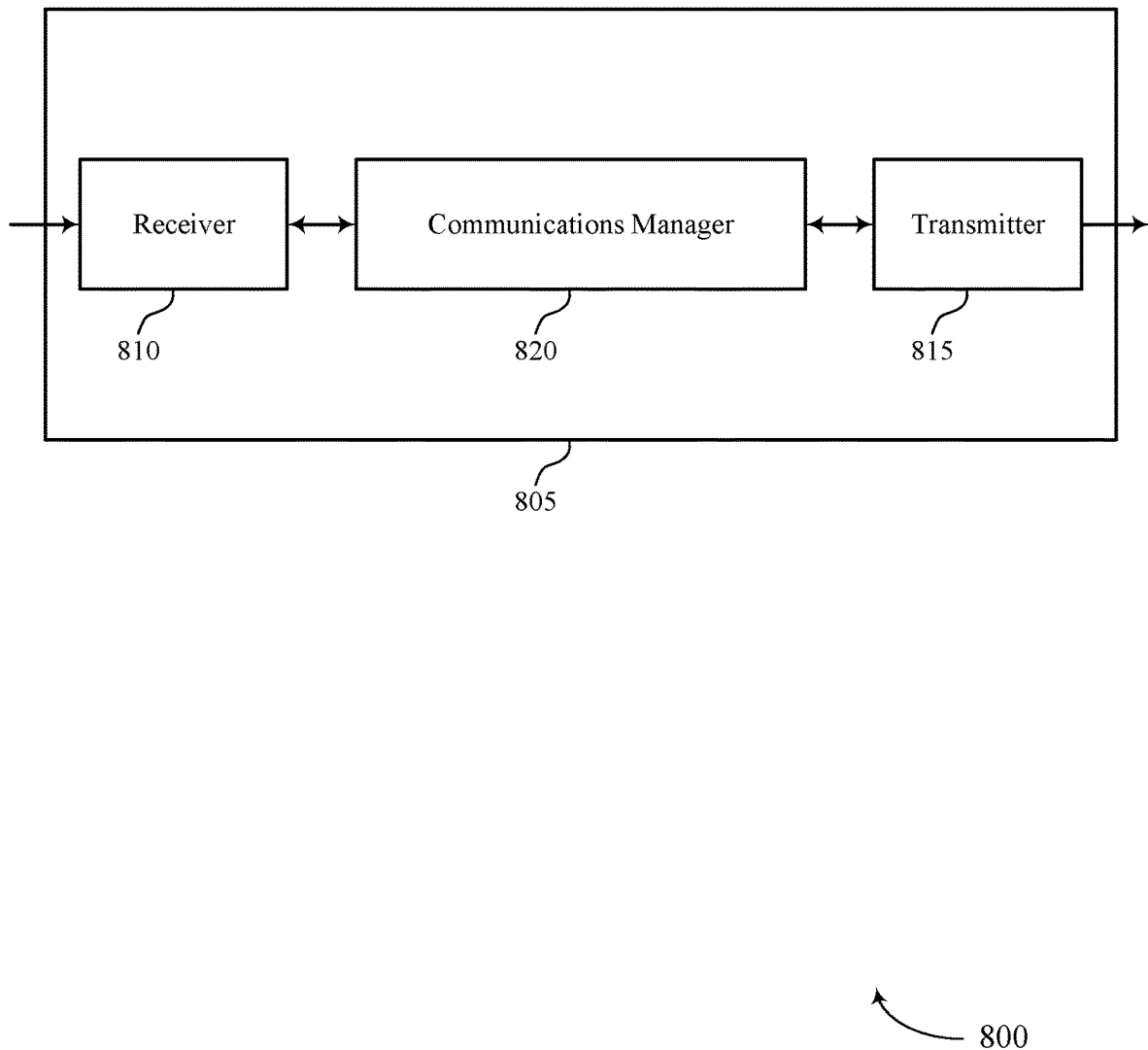
FIGS. 8 and 9 illustrate block diagrams of devices that support instantaneous amplitude gain side information for a multiplexed signal in accordance with one or more aspects of the present disclosure.

FIG. 8 illustrates a block diagram 800 of a device 805 that supports instantaneous amplitude gain side information for a multiplexed signal in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of instantaneous amplitude gain side information for a multiplexed signal as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a transmitting device in accordance with examples as disclosed herein. For example, the communications manager 820 may be configured as or otherwise support a means for transmitting, to a UE, an indication of an instantaneous gain associated with an amplitude distortion associated with FDM downlink communication to the UE from the transmitting device. The communications manager 820 may be configured as or otherwise support a means for transmitting the FDM downlink communication to the UE over frequency resources allocated to the UE, where the UE applies a digital post distortion model to the FDM downlink communication according to the instantaneous gain.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for signaling an indication of an instantaneous gain associated with amplitude distortion of a signal or waveform carrying an FDM communications to one or more UE. The instantaneous gain indication may enable each UE to extract and reconstruct the portion of the signal or waveform carrying its allocated message, without having to slice the allocations for each UE included in the FDM communications.

Figure 9:
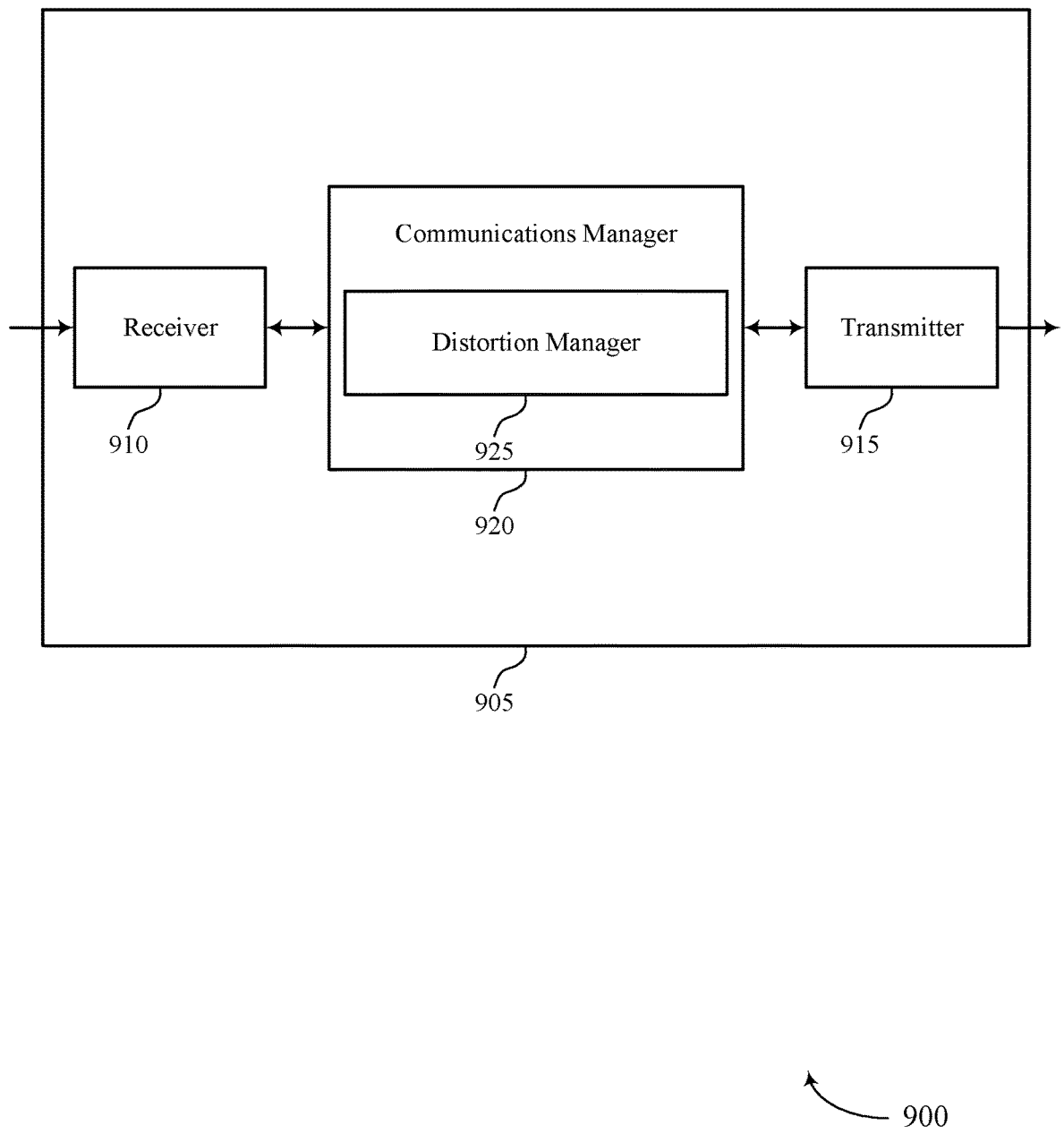

FIG. 9 illustrates a block diagram 900 of a device 905 that supports instantaneous amplitude gain side information for a multiplexed signal in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of instantaneous amplitude gain side information for a multiplexed signal as described herein. For example, the communications manager 920 may include a distortion manager 925, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a transmitting device in accordance with examples as disclosed herein. The distortion manager 925 may be configured as or otherwise support a means for transmitting, to a UE, an indication of an instantaneous gain associated with an amplitude distortion associated with FDM downlink communication to the UE from the transmitting device. The distortion manager 925 may be configured as or otherwise support a means for transmitting the FDM downlink communication to the UE over frequency resources allocated to the UE, where the UE applies a digital post distortion model to the FDM downlink communication according to the instantaneous gain.

Figure 10:
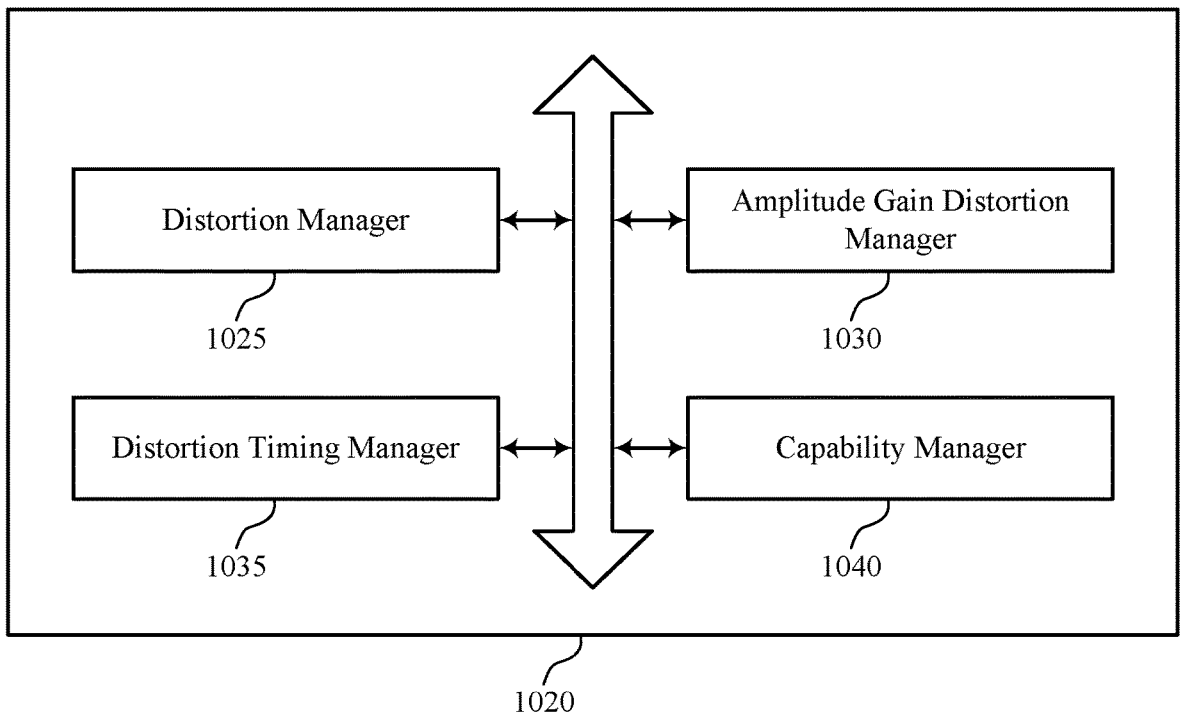
FIG. 10 illustrates a block diagram of a communications manager that supports instantaneous amplitude gain side information for a multiplexed signal in accordance with one or more aspects of the present disclosure.

FIG. 10 illustrates a block diagram 1000 of a communications manager 1020 that supports instantaneous amplitude gain side information for a multiplexed signal in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of instantaneous amplitude gain side information for a multiplexed signal as described herein. For example, the communications manager 1020 may include a distortion manager 1025, an amplitude gain distortion manager 1030, a distortion timing manager 1035, a capability manager 1040, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a transmitting device in accordance with examples as disclosed herein. The distortion manager 1025 may be configured as or otherwise support a means for transmitting, to a UE, an indication of an instantaneous gain associated with an amplitude distortion associated with FDM downlink communication to the UE from the transmitting device. In some examples, the distortion manager 1025 may be configured as or otherwise support a means for transmitting the FDM downlink communication to the UE over frequency resources allocated to the UE, where the UE applies a digital post distortion model to the FDM downlink communication according to the instantaneous gain.

In some examples, the amplitude gain distortion manager 1030 may be configured as or otherwise support a means for identifying the amplitude distortion associated with the FDM downlink communication, where the instantaneous gain is based on the amplitude distortion.

In some examples, the distortion timing manager 1035 may be configured as or otherwise support a means for identifying a set of amplitude distortions for a corresponding time period of a set of time periods of the FDM downlink communications, where the instantaneous gain is based on the set of amplitude distortions. In some examples, the distortion timing manager 1035 may be configured as or otherwise support a means for identifying each amplitude distortion in the set of amplitude distortions based on a corresponding instantaneous gain for the corresponding time period satisfying a threshold, where the instantaneous gain is based on the corresponding instantaneous gain for the corresponding time period.

In some examples, the distortion timing manager 1035 may be configured as or otherwise support a means for identifying the set of time periods based on a threshold number of amplitude distortions satisfying a threshold. In some examples, the distortion timing manager 1035 may be configured as or otherwise support a means for identifying a start time, a duration, or a combination thereof, for each amplitude distortion of the set of amplitude distortions, where the set of time periods is based on the start time, the duration, or the combination thereof.

In some examples, the capability manager 1040 may be configured as or otherwise support a means for receiving a UE capability message indicating that the UE supports applying the digital post distortion model based on the instantaneous gain. In some examples, the capability manager 1040 may be configured as or otherwise support a means for transmitting an instruction to apply the digital post distortion model at the UE. In some examples, to support transmitting the instruction, the capability manager 1040 may be configured as or otherwise support a means for transmitting a downlink control information scheduling transmission of the FDM downlink communications to the UE, where the instruction to apply the digital post distortion model is conveyed in the downlink control information.

In some examples, to support transmitting the instruction, the capability manager 1040 may be configured as or otherwise support a means for transmitting instructions for the UE to switch from a first semi-static state to a second semi-static state, where the instructions for the UE to switch to the second semi-static state conveys the instruction to apply the digital post distortion model to the FDM downlink communications. In some examples, to support transmitting the instruction, the capability manager 1040 may be configured as or otherwise support a means for transmitting radio resource control signaling one or more parameters for the UE, where at least one of the one or more parameters is set to a value that conveys the instruction to apply the digital post distortion model to the FDM downlink communications. In some examples, the indication of the instantaneous gain is transmitted via one or more of a downlink control information, a data channel, a dedicated channel, or a combination thereof.

Figure 11:
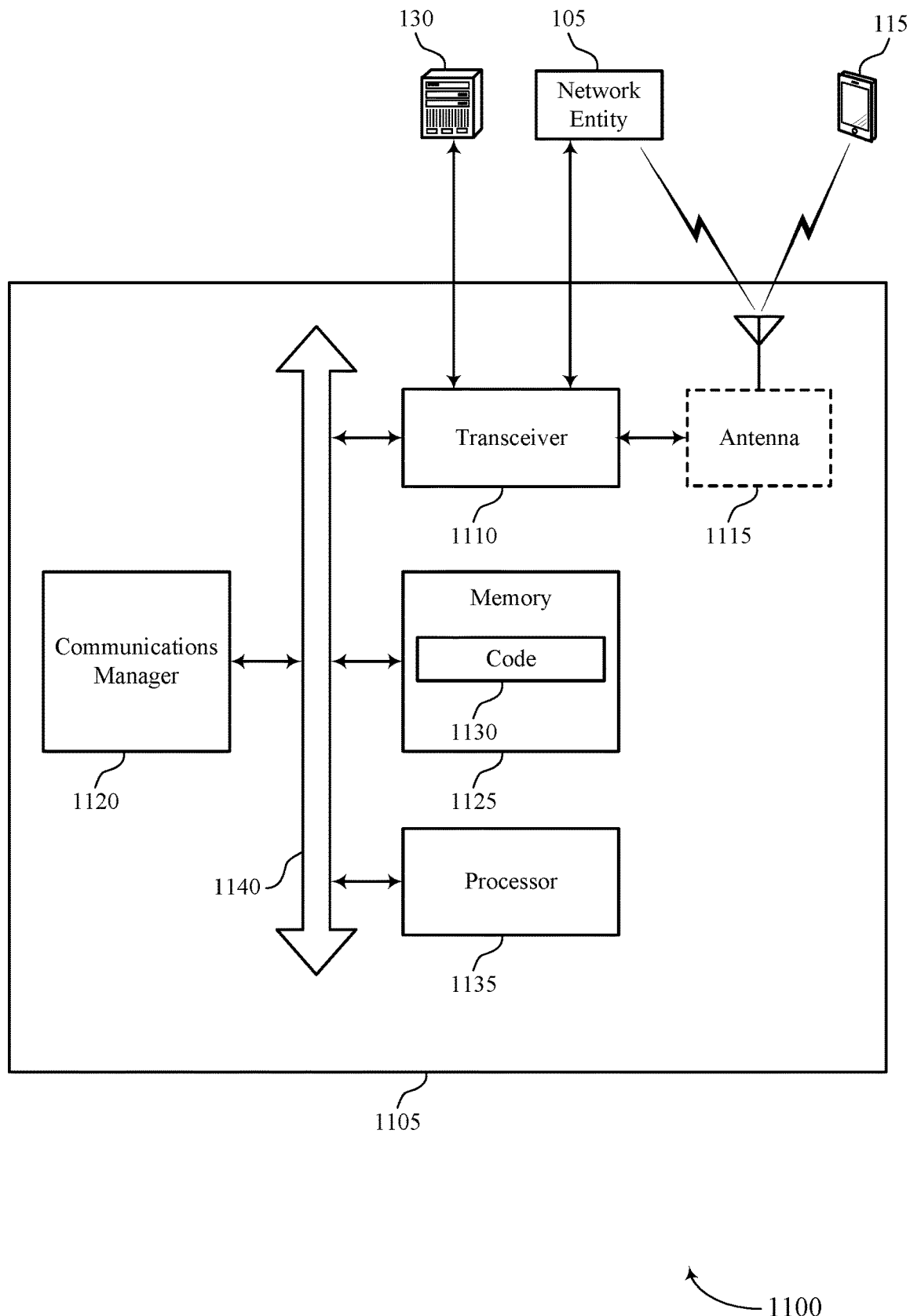
FIG. 11 illustrates a diagram of a system including a device that supports instantaneous amplitude gain side information for a multiplexed signal in accordance with one or more aspects of the present disclosure.

FIG. 11 illustrates a diagram of a system 1100 including a device 1105 that supports instantaneous amplitude gain side information for a multiplexed signal in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting instantaneous amplitude gain side information for a multiplexed signal). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a transmitting device in accordance with examples as disclosed herein. For example, the communications manager 1120 may be configured as or otherwise support a means for transmitting, to a UE, an indication of an instantaneous gain associated with an amplitude distortion associated with FDM downlink communication to the UE from the transmitting device. The communications manager 1120 may be configured as or otherwise support a means for transmitting the FDM downlink communication to the UE over frequency resources allocated to the UE, where the UE applies a digital post distortion model to the FDM downlink communication according to the instantaneous gain.

By including or configuring the communications manager 1120 in accordance with examples as described herein, the device 1105 may support techniques for signaling an indication of an instantaneous gain associated with amplitude distortion of a signal or waveform carrying an FDM communications to one or more UE. The instantaneous gain indication may enable each UE to extract and reconstruct the portion of the signal or waveform carrying its allocated message, without having to slice the allocations for each UE included in the FDM communications.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of instantaneous amplitude gain side information for a multiplexed signal as described herein, or the processor 1135 and the memory 1125 may be otherwise configured to perform or support such operations.

Figure 12:
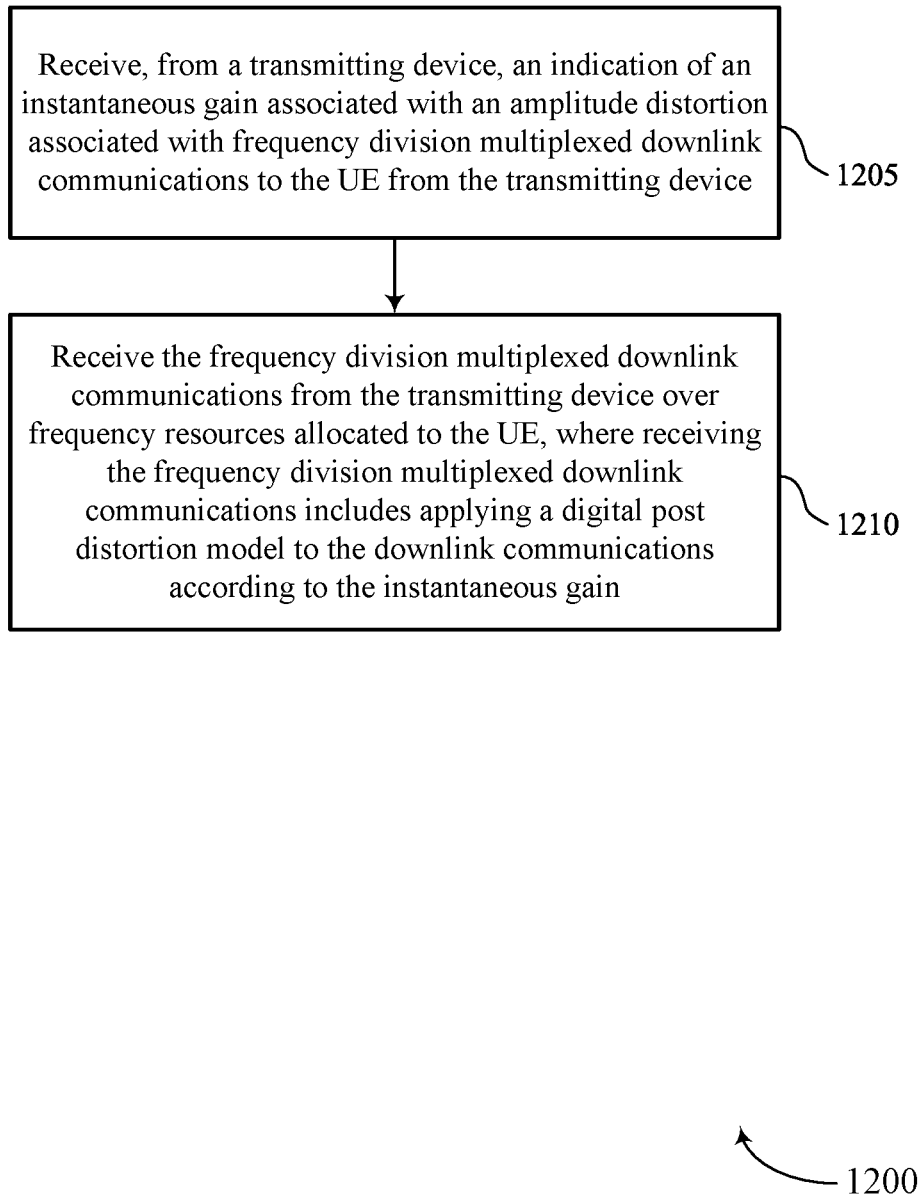
FIGS. 12 through 16 illustrate flowcharts showing methods that support instantaneous amplitude gain side information for a multiplexed signal in accordance with one or more aspects of the present disclosure.

FIG. 12 illustrates a flowchart illustrating a method 1200 that supports instantaneous amplitude gain side information for a multiplexed signal in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a transmitting device, an indication of an instantaneous gain associated with an amplitude distortion associated with FDM downlink communications to the UE from the transmitting device. The operations of 1205 may be performed in accordance with examples as disclosed herein. In some examples, aspects of the operations of 1205 may be performed by an amplitude gain distortion manager 625 as described with reference to FIG. 6.

At 1210, the method may include receiving the FDM downlink communications from the transmitting device over frequency resources allocated to the UE, where receiving the FDM downlink communications includes applying a digital post distortion model to the frequency division multiplexed downlink communications according to the instantaneous gain. The operations of 1210 may be performed in accordance with examples as disclosed herein. In some examples, aspects of the operations of 1210 may be performed by a digital post-distortion manager 630 as described with reference to FIG. 6.

Figure 13:
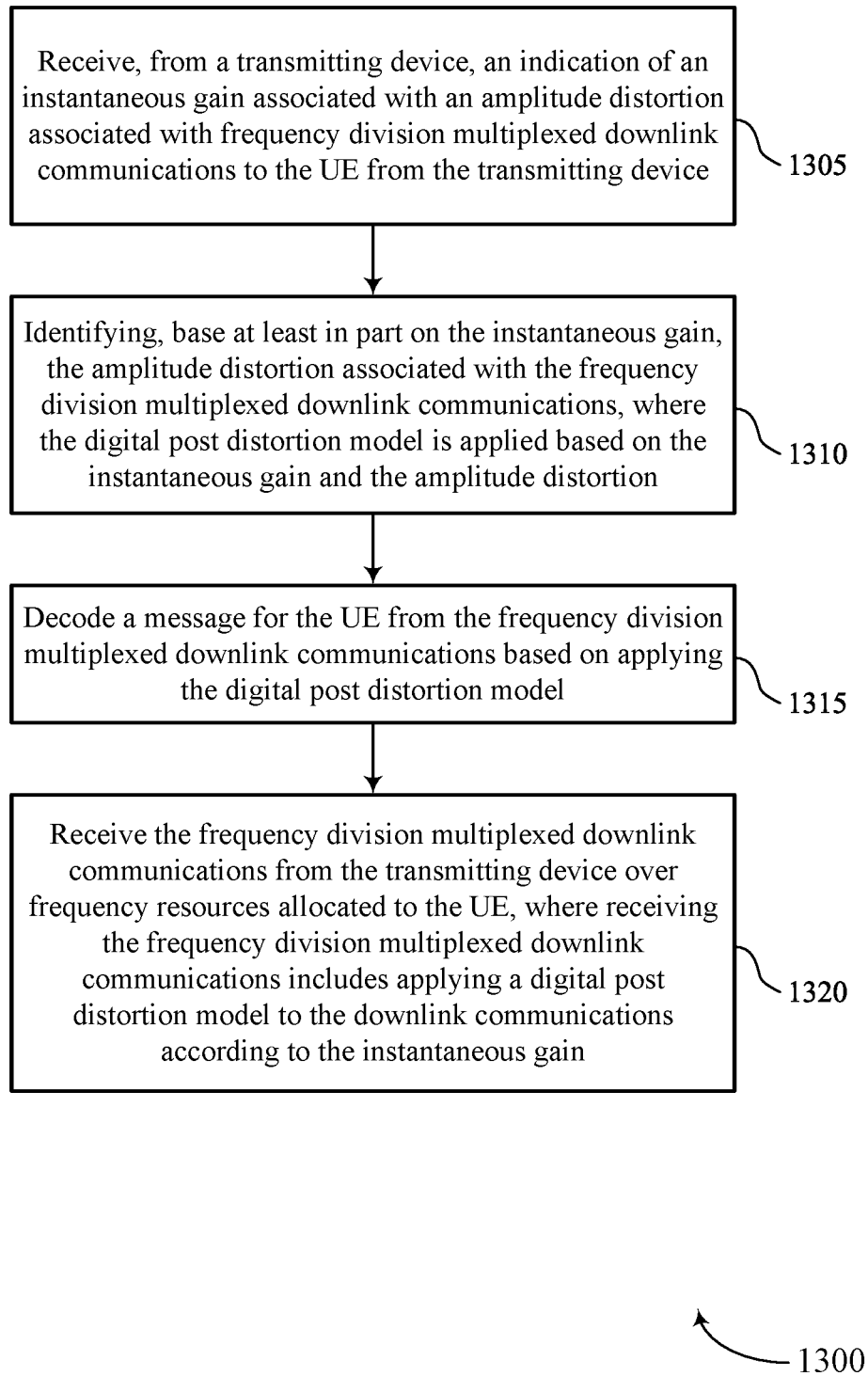

FIG. 13 illustrates a flowchart illustrating a method 1300 that supports instantaneous amplitude gain side information for a multiplexed signal in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving, from a transmitting device, an indication of an instantaneous gain associated with an amplitude distortion associated with FDM downlink communications to the UE from the transmitting device. The operations of 1305 may be performed in accordance with examples as disclosed herein. In some examples, aspects of the operations of 1305 may be performed by an amplitude gain distortion manager 625 as described with reference to FIG. 6.

At 1310, the method may include identifying, based on the instantaneous gain, the amplitude distortion associated with the FDM downlink communications, where the digital post distortion model is applied based on the instantaneous gain and the amplitude distortion. The operations of 1310 may be performed in accordance with examples as disclosed herein. In some examples, aspects of the operations of 1310 may be performed by a digital post-distortion manager 630 as described with reference to FIG. 6.

At 1315, the method may include decoding a message for the UE from the FDM downlink communications based on applying the digital post distortion model. The operations of 1315 may be performed in accordance with examples as disclosed herein. In some examples, aspects of the operations of 1315 may be performed by a digital post-distortion manager 630 as described with reference to FIG. 6.

At 1320, the method may include receiving the FDM downlink communications from the transmitting device over frequency resources allocated to the UE, where receiving the FDM downlink communications includes applying a digital post distortion model to the frequency division multiplexed downlink communications according to the instantaneous gain. The operations of 1320 may be performed in accordance with examples as disclosed herein. In some examples, aspects of the operations of 1320 may be performed by a digital post-distortion manager 630 as described with reference to FIG. 6.

Figure 14:
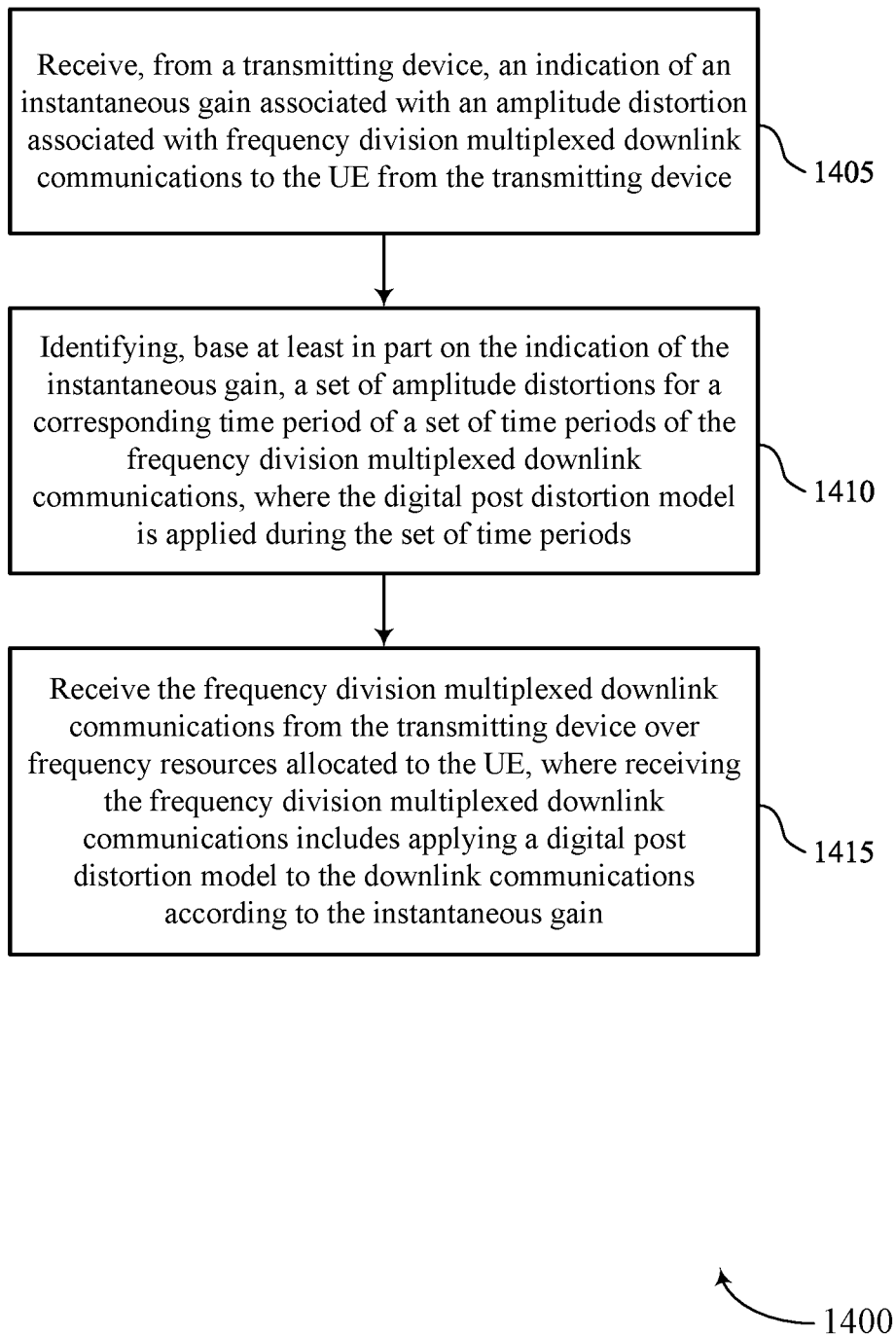

FIG. 14 illustrates a flowchart illustrating a method 1400 that supports instantaneous amplitude gain side information for a multiplexed signal in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving, from a transmitting device, an indication of an instantaneous gain associated with an amplitude distortion associated with FDM downlink communications to the UE from the transmitting device. The operations of 1405 may be performed in accordance with examples as disclosed herein. In some examples, aspects of the operations of 1405 may be performed by an amplitude gain distortion manager 625 as described with reference to FIG. 6.

At 1410, the method may include identifying, based on the indication of the instantaneous gain, a set of amplitude distortions for a corresponding time period of a set of time periods of the FDM downlink communications, where the digital post distortion model is applied during the set of time periods. The operations of 1410 may be performed in accordance with examples as disclosed herein. In some examples, aspects of the operations of 1410 may be performed by a distortion timing manager 635 as described with reference to FIG. 6.

At 1415, the method may include receiving the FDM downlink communications from the transmitting device over frequency resources allocated to the UE, where receiving the FDM downlink communications includes applying a digital post distortion model to the frequency division multiplexed downlink communications according to the instantaneous gain. The operations of 1415 may be performed in accordance with examples as disclosed herein. In some examples, aspects of the operations of 1415 may be performed by a digital post-distortion manager 630 as described with reference to FIG. 6.

Figure 15:
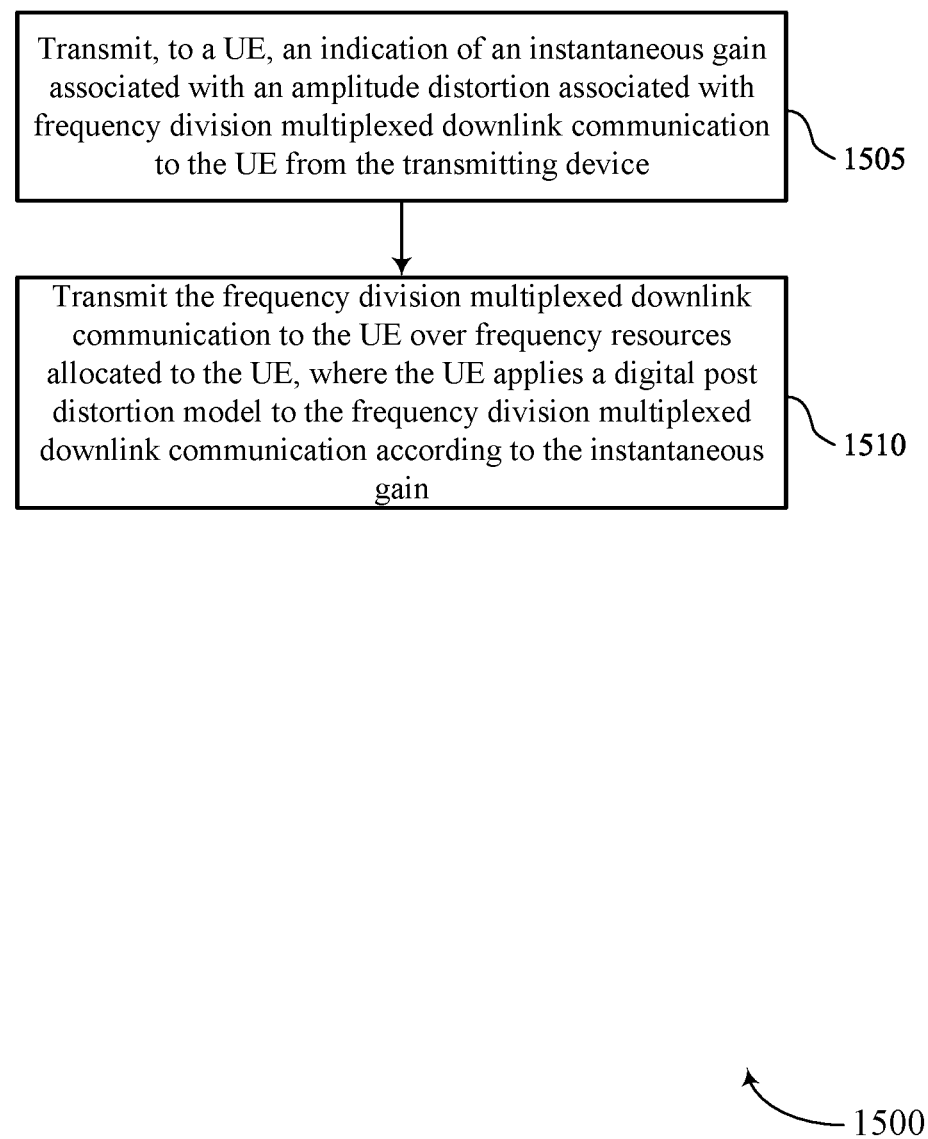

FIG. 15 illustrates a flowchart illustrating a method 1500 that supports instantaneous amplitude gain side information for a multiplexed signal in accordance with one or more aspects of the present disclosure. The operations of the method 1500 may be implemented by a UE or a network entity or its components as described herein. For example, the operations of the method 1500 may be performed by a UE 115 as described with reference to FIGS. 1 through 7 or a network entity as described with reference to FIGS. 1 through 3 and 8 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1505, the method may include transmitting, to a UE, an indication of an instantaneous gain associated with an amplitude distortion associated with FDM downlink communication to the UE from the transmitting device. The operations of 1505 may be performed in accordance with examples as disclosed herein. In some examples, aspects of the operations of 1505 may be performed by a digital post-distortion manager 630 or a distortion manager 1025 as described with reference to FIGS. 6 and 10.

At 1510, the method may include transmitting the FDM downlink communication to the UE over frequency resources allocated to the UE, where the UE applies a digital post distortion model to the FDM downlink communication according to the instantaneous gain. The operations of 1510 may be performed in accordance with examples as disclosed herein. In some examples, aspects of the operations of 1510 may be performed by a digital post-distortion manager 630 or a distortion manager 1025 as described with reference to FIGS. 6 and 10.

Figure 16:
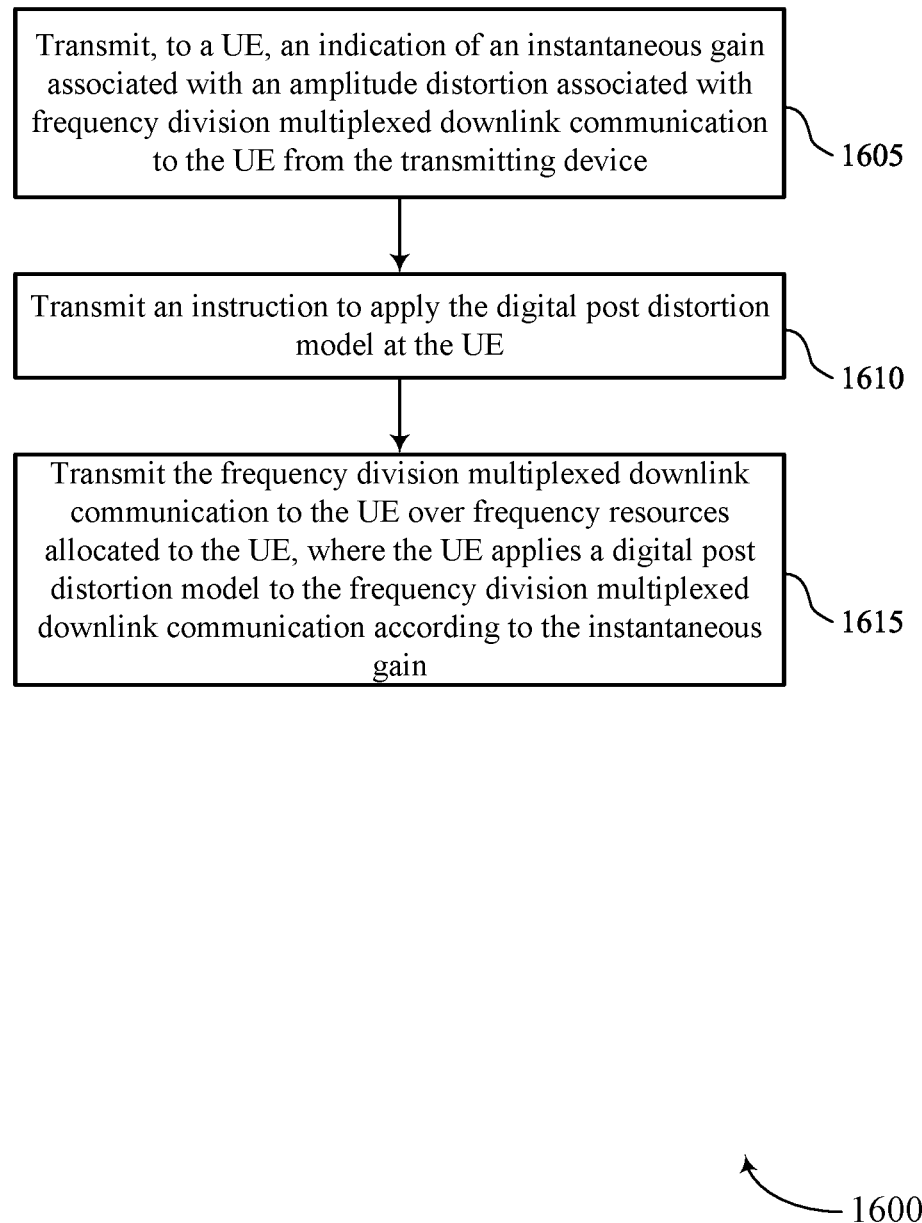

FIG. 16 illustrates a flowchart illustrating a method 1600 that supports instantaneous amplitude gain side information for a multiplexed signal in accordance with one or more aspects of the present disclosure. The operations of the method 1600 may be implemented by a UE or a network entity or its components as described herein. For example, the operations of the method 1600 may be performed by a UE 115 as described with reference to FIGS. 1 through 7 or a network entity as described with reference to FIGS. 1 through 3 and 8 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method may include transmitting, to a UE, an indication of an instantaneous gain associated with an amplitude distortion associated with FDM downlink communication to the UE from the transmitting device. The operations of 1605 may be performed in accordance with examples as disclosed herein. In some examples, aspects of the operations of 1605 may be performed by a digital post-distortion manager 630 or a distortion manager 1025 as described with reference to FIGS. 6 and 10.

At 1610, the method may include transmitting an instruction to apply the digital post distortion model at the UE. The operations of 1610 may be performed in accordance with examples as disclosed herein. In some examples, aspects of the operations of 1610 may be performed by a capability manager 640 or a capability manager 1040 as described with reference to FIGS. 6 and 10.

At 1615, the method may include transmitting the FDM downlink communication to the UE over frequency resources allocated to the UE, where the UE applies a digital post distortion model to the FDM downlink communication according to the instantaneous gain. The operations of 1615 may be performed in accordance with examples as disclosed herein. In some examples, aspects of the operations of 1615 may be performed by a digital post-distortion manager 630 or a distortion manager 1025 as described with reference to FIGS. 6 and 10.

The following provides an overview of aspects of the present disclosure:

Aspect 1: A method for wireless communication at a UE, comprising: receiving, from a transmitting device, an indication of an instantaneous gain associated with an amplitude distortion associated with FDM downlink communications to the UE from the transmitting device; and receiving the FDM downlink communications from the transmitting device over frequency resources allocated to the UE, wherein receiving the FDM downlink communications comprises applying a DPOD model to the frequency division multiplexed downlink communications according to the instantaneous gain.

Aspect 2: The method of aspect 1, further comprising: identifying, based at least in part on the instantaneous gain, the amplitude distortion associated with the FDM downlink communications, wherein the DPOD model is applied based at least in part on the instantaneous gain and the amplitude distortion; and decoding a message for the UE from the FDM downlink communications based at least in part on applying the DPOD model.

Aspect 3: The method of any of aspects 1 through 2, further comprising: identifying, based at least in part on the indication of the instantaneous gain, a set of amplitude distortions for a corresponding time period of a set of time periods of the FDM downlink communications, wherein the DPOD model is applied during the set of time periods.

Aspect 4: The method of aspect 3, further comprising: identifying each amplitude distortion in the set of amplitude distortions based at least in part on a corresponding instantaneous gain for the corresponding time period satisfying a threshold.

Aspect 5: The method of any of aspects 3 through 4, further comprising: identifying the set of time periods based at least in part on a threshold number of amplitude distortions satisfying an amplitude distortion threshold level.

Aspect 6: The method of any of aspects 3 through 5, further comprising: identifying, based at least in part on the indication of the instantaneous gain, a start time, a duration, or a combination thereof, for each amplitude distortion of the set of amplitude distortions, wherein the set of time periods is based at least in part on the start time, the duration, or the combination thereof.

Aspect 7: The method of any of aspects 1 through 6, further comprising: transmitting a UE capability message indicating that the UE supports applying the DPOD model based on the instantaneous gain.

Aspect 8: The method of any of aspects 1 through 7, further comprising: receiving an instruction to apply the DPOD model at the UE.

Aspect 9: The method of aspect 8, wherein receiving the instruction comprises: receiving a downlink control information scheduling transmission of the FDM downlink communication to the UE, wherein the instruction to apply the DPOD model is conveyed in the downlink control information.

Aspect 10: The method of any of aspects 8 through 9, wherein receiving the instruction comprises: receiving instructions to switch from a first semi-static state to a second semi-static state, wherein the instructions to switch to the second semi-static state conveys the instruction to apply the DPOD model to the FDM downlink communications.

Aspect 11: The method of any of aspects 8 through 10, wherein receiving the instruction comprises: receiving radio resource control signaling one or more parameters for the UE, wherein at least one of the one or more parameters is set to a value that conveys the instruction to apply the DPOD model to the FDM downlink communications.

Aspect 12: The method of any of aspects 1 through 11, wherein the indication of the instantaneous gain is received via one or more of a downlink control information, a data channel, a dedicated channel, or a combination thereof.

Aspect 13: The method of any of aspects 1 through 12, wherein the FDM downlink communications are multiplexed with one or more additional FDM downlink communications associated with one or more additional UEs.

Aspect 14: The method of aspect 13, wherein the FDM downlink communications and the one or more additional FDM downlink communications are associated with a same transmit beam of the transmitting device.

Aspect 15: The method of any of aspects 1 through 14, wherein applying the DPOD model to the FDM downlink communications comprises at least one of estimating a channel that includes allocations for the FDM downlink communications, estimating constellation points of signals associated with the channel, equalizing the signals, estimating non-linearities of the signals, correcting for the non-linearities of at least a portion of the signals, or a combination thereof.

Aspect 16: A method for wireless communication at a transmitting device, comprising: transmitting, to a UE, an indication of an instantaneous gain associated with an amplitude distortion associated with FDM downlink communication to the UE from the transmitting device; and transmitting the FDM downlink communication to the UE over frequency resources allocated to the UE, where the UE applies a DPOD model to the FDM downlink communication according to the instantaneous gain.

Aspect 17: The method of aspect 16, further comprising: identifying the amplitude distortion associated with the FDM downlink communication, wherein the instantaneous gain is based at least in part on the amplitude distortion.

Aspect 18: The method of any of aspects 16 through 17, further comprising: identifying a set of amplitude distortions for a corresponding time period of a set of time periods of the FDM downlink communications, wherein the instantaneous gain is based at least in part on the set of amplitude distortions.

Aspect 19: The method of aspect 18, further comprising: identifying each amplitude distortion in the set of amplitude distortions based at least in part on a corresponding instantaneous gain for the corresponding time period satisfying a threshold, wherein the instantaneous gain is based at least in part on the corresponding instantaneous gain for the corresponding time period.

Aspect 20: The method of any of aspects 18 through 19, further comprising: identifying the set of time periods based at least in part on a threshold number of amplitude distortions satisfying a threshold.

Aspect 21: The method of any of aspects 18 through 20, further comprising: identifying a start time, a duration, or a combination thereof, for each amplitude distortion of the set of amplitude distortions, wherein the set of time periods is based at least in part on the start time, the duration, or the combination thereof.

Aspect 22: The method of any of aspects 16 through 21, further comprising: receiving a UE capability message indicating that the UE supports applying the DPOD model based on the instantaneous gain.

Aspect 23: The method of any of aspects 16 through 22, further comprising: transmitting an instruction to apply the DPOD model at the UE.

Aspect 24: The method of aspect 23, wherein transmitting the instruction comprises: transmitting a downlink control information scheduling transmission of the FDM downlink communications to the UE, wherein the instruction to apply the DPOD model is conveyed in the downlink control information.

Aspect 25: The method of any of aspects 23 through 24, wherein transmitting the instruction comprises: transmitting instructions for the UE to switch from a first semi-static state to a second semi-static state, wherein the instructions for the UE to switch to the second semi-static state conveys the instruction to apply the DPOD model to the FDM downlink communications.

Aspect 26: The method of any of aspects 23 through 25, wherein transmitting the instruction comprises: transmitting radio resource control signaling one or more parameters for the UE, wherein at least one of the one or more parameters is set to a value that conveys the instruction to apply the DPOD model to the FDM downlink communications.

Aspect 27: The method of any of aspects 16 through 26, wherein the indication of the instantaneous gain is transmitted via one or more of a downlink control information, a data channel, a dedicated channel, or a combination thereof.

Aspect 28: An apparatus for wireless communication at a UE, comprising: a processor; memory coupled with the processor; and instructions stored in the memory and executable by the processor to cause the apparatus to perform a method of any of aspects 1 through 15.

Aspect 29: An apparatus for wireless communication at a UE, comprising at least one means for performing a method of any of aspects 1 through 15.

Aspect 30: A non-transitory computer-readable medium storing code for wireless communication at a UE, the code comprising instructions executable by a processor to perform a method of any of aspects 1 through 15.

Aspect 31: An apparatus for wireless communication at a transmitting device, comprising a processor; memory coupled with the processor; and instructions stored in the memory and executable by the processor to cause the apparatus to perform a method of any of aspects 16 through 27.

Aspect 32: An apparatus for wireless communication at a transmitting device, comprising at least one means for performing a method of any of aspects 16 through 27.

Aspect 33: A non-transitory computer-readable medium storing code for wireless communication at a transmitting device, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor;
memory coupled with the processor; and
instructions stored in the memory and executable by the processor to cause the apparatus to:
receive, from a transmitting device, an indication of an instantaneous gain associated with an amplitude distortion associated with frequency division multiplexed downlink communications to the UE from the transmitting device; and
receive the frequency division multiplexed downlink communications from the transmitting device over frequency resources allocated to the UE, wherein receiving the frequency division multiplexed downlink communications comprises applying a digital post distortion model to the frequency division multiplexed downlink communications according to the instantaneous gain.

2. The apparatus of claim 1, wherein the instructions are further executable by the processor to cause the apparatus to:
identify, based at least in part on the instantaneous gain, the amplitude distortion associated with the frequency division multiplexed downlink communications, wherein the digital post distortion model is applied based at least in part on the instantaneous gain and the amplitude distortion; and
decode a message for the UE from the frequency division multiplexed downlink communications based at least in part on applying the digital post distortion model.

3. The apparatus of claim 1, wherein the instructions are further executable by the processor to cause the apparatus to:
identify, based at least in part on the indication of the instantaneous gain, a set of amplitude distortions for a corresponding time period of a set of time periods of the frequency division multiplexed downlink communications, wherein the digital post distortion model is applied during the set of time periods.

4. The apparatus of claim 3, wherein the instructions are further executable by the processor to cause the apparatus to:
identify each amplitude distortion in the set of amplitude distortions based at least in part on a corresponding instantaneous gain for the corresponding time period satisfying a threshold.

5. The apparatus of claim 3, wherein the instructions are further executable by the processor to cause the apparatus to:
identify the set of time periods based at least in part on a threshold number of amplitude distortions satisfying an amplitude distortion threshold level.

6. The apparatus of claim 3, wherein the instructions are further executable by the processor to cause the apparatus to:
identify, based at least in part on the indication of the instantaneous gain, a start time, a duration, or a combination thereof, for each amplitude distortion of the set of amplitude distortions, wherein the set of time periods is based at least in part on the start time, the duration, or the combination thereof.

7. The apparatus of claim 1, wherein the instructions are further executable by the processor to cause the apparatus to:
transmit a UE capability message indicating that the UE supports applying the digital post distortion model based on the instantaneous gain.

8. The apparatus of claim 1, wherein the instructions are further executable by the processor to cause the apparatus to:
receive an instruction to apply the digital post distortion model at the UE.

9. The apparatus of claim 8, wherein the instructions to receive the instruction are executable by the processor to cause the apparatus to:
receive a downlink control information scheduling transmission of the frequency division multiplexed downlink communication to the UE, wherein the instruction to apply the digital post distortion model is conveyed in the downlink control information.

10. The apparatus of claim 8, wherein the instructions to receive the instruction are executable by the processor to cause the apparatus to:
receive instructions to switch from a first semi-static state to a second semi-static state, wherein the instructions to switch to the second semi-static state conveys the instruction to apply the digital post distortion model to the frequency division multiplexed downlink communications.

11. The apparatus of claim 8, wherein the instructions to receive the instruction are executable by the processor to cause the apparatus to:
receive radio resource control signaling one or more parameters for the UE, wherein at least one of the one or more parameters is set to a value that conveys the instruction to apply the digital post distortion model to the frequency division multiplexed downlink communications.

12. The apparatus of claim 1, wherein the indication of the instantaneous gain is received via one or more of a downlink control information, a data channel, a dedicated channel, or a combination thereof.

13. The apparatus of claim 1, wherein the frequency division multiplexed downlink communications are multiplexed with one or more additional frequency division multiplexed downlink communications associated with one or more additional UEs.

14. The apparatus of claim 13, wherein the frequency division multiplexed downlink communications and the one or more additional frequency division multiplexed downlink communications are associated with a same transmit beam of the transmitting device.

15. The apparatus of claim 1, wherein applying the digital post distortion model to the frequency division multiplexed downlink communications comprises at least one of estimating a channel that includes allocations for the frequency division multiplexed downlink communications, estimating constellation points of signals associated with the channel, equalizing the signals, estimating non-linearities of the signals, correcting for the non-linearities of at least a portion of the signals, or a combination thereof.

16. An apparatus for wireless communications at a transmitting device, comprising:
a processor;
memory coupled with the processor; and
instructions stored in the memory and executable by the processor to cause the apparatus to:
transmit, to a user equipment (UE), an indication of an instantaneous gain associated with an amplitude distortion associated with frequency division multiplexed downlink communication to the UE from the transmitting device; and
transmit the frequency division multiplexed downlink communication to the UE over frequency resources allocated to the UE, where the UE applies a digital post distortion model to the frequency division multiplexed downlink communication according to the instantaneous gain.

17. The apparatus of claim 16, wherein the instructions are further executable by the processor to cause the apparatus to:
identify the amplitude distortion associated with the frequency division multiplexed downlink communication, wherein the instantaneous gain is based at least in part on the amplitude distortion.

18. The apparatus of claim 16, wherein the instructions are further executable by the processor to cause the apparatus to:
identify a set of amplitude distortions for a corresponding time period of a set of time periods of the frequency division multiplexed downlink communications, wherein the instantaneous gain is based at least in part on the set of amplitude distortions.

19. The apparatus of claim 18, wherein the instructions are further executable by the processor to cause the apparatus to:
identify each amplitude distortion in the set of amplitude distortions based at least in part on a corresponding instantaneous gain for the corresponding time period satisfying a threshold, wherein the instantaneous gain is based at least in part on the corresponding instantaneous gain for the corresponding time period.

20. The apparatus of claim 18, wherein the instructions are further executable by the processor to cause the apparatus to:
identify the set of time periods based at least in part on a threshold number of amplitude distortions satisfying a threshold.

21. The apparatus of claim 18, wherein the instructions are further executable by the processor to cause the apparatus to:
identify a start time, a duration, or a combination thereof, for each amplitude distortion of the set of amplitude distortions, wherein the set of time periods is based at least in part on the start time, the duration, or the combination thereof.

22. The apparatus of claim 16, wherein the instructions are further executable by the processor to cause the apparatus to:
receive a UE capability message indicating that the UE supports applying the digital post distortion model based on the instantaneous gain.

23. The apparatus of claim 16, wherein the instructions are further executable by the processor to cause the apparatus to:
transmit an instruction to apply the digital post distortion model at the UE.

24. The apparatus of claim 23, wherein the instructions to transmit the instruction are executable by the processor to cause the apparatus to:
transmit a downlink control information scheduling transmission of the frequency division multiplexed downlink communications to the UE, wherein the instruction to apply the digital post distortion model is conveyed in the downlink control information.

25. The apparatus of claim 23, wherein the instructions to transmit the instruction are executable by the processor to cause the apparatus to:
transmit instructions for the UE to switch from a first semi-static state to a second semi-static state, wherein the instructions for the UE to switch to the second semi-static state conveys the instruction to apply the digital post distortion model to the frequency division multiplexed downlink communications.

26. The apparatus of claim 23, wherein the instructions to transmit the instruction are executable by the processor to cause the apparatus to:
transmit radio resource control signaling one or more parameters for the UE, wherein at least one of the one or more parameters is set to a value that conveys the instruction to apply the digital post distortion model to the frequency division multiplexed downlink communications.

27. The apparatus of claim 16, wherein the indication of the instantaneous gain is transmitted via one or more of a downlink control information, a data channel, a dedicated channel, or a combination thereof.

28. A method for wireless communications at a user equipment (UE), comprising:
receiving, from a transmitting device, an indication of an instantaneous gain associated with an amplitude distortion associated with frequency division multiplexed downlink communications to the UE from the transmitting device; and
receiving the frequency division multiplexed downlink communications from the transmitting device over frequency resources allocated to the UE, wherein receiving the frequency division multiplexed downlink communications comprises applying a digital post distortion model to the frequency division multiplexed downlink communications according to the instantaneous gain.

29. The method of claim 28, further comprising:
identifying, based at least in part on the instantaneous gain, the amplitude distortion associated with the frequency division multiplexed downlink communications, wherein the digital post distortion model is applied based at least in part on the instantaneous gain and the amplitude distortion; and
decoding a message for the UE from the frequency division multiplexed downlink communications based at least in part on applying the digital post distortion model.

30. A method for wireless communications at a transmitting device, comprising:
transmitting, to a user equipment (UE), an indication of an instantaneous gain associated with an amplitude distortion associated with frequency division multiplexed downlink communication to the UE from the transmitting device; and
transmitting the frequency division multiplexed downlink communication to the UE over frequency resources allocated to the UE, where the UE applies a digital post distortion model to the frequency division multiplexed downlink communication according to the instantaneous gain.

* * * * *